(12) United States Patent
Gordin et al.

(10) Patent No.: US 10,337,693 B1
(45) Date of Patent: Jul. 2, 2019

(54) APPARATUS METHOD, AND SYSTEM FOR COST-EFFECTIVE LIGHTING SYSTEM RETROFITS INCLUDING LED LUMINAIRES

(71) Applicant: Musco Corporation, Oskaloosa, IA (US)

(72) Inventors: Myron Gordin, Oskaloosa, IA (US); Timothy A. Barker, Oskaloosa, IA (US); Andrew J. Schembs, Johnston, IA (US); Alan W. Sheldon, Pella, IA (US); Luke C. McKee, Oskaloosa, IA (US); Chris P. Lickiss, Newton, IA (US); Aric D. Klyn, Pella, IA (US); Joel D. DeBoef, New Sharon, IA (US)

(73) Assignee: Musco Corporation, Oskaloosa, IA (US)

( * ) Notice: Subject to any disclaimer, the term of this patent is extended or adjusted under 35 U.S.C. 154(b) by 37 days.

(21) Appl. No.: 15/826,772

(22) Filed: Nov. 30, 2017

Related U.S. Application Data

(60) Provisional application No. 62/522,345, filed on Jun. 20, 2017, provisional application No. 62/457,641, filed on Feb. 10, 2017.

(51) Int. Cl.
*F21V 7/04* (2006.01)
*F21V 21/26* (2006.01)
(Continued)

(52) U.S. Cl.
CPC ............... *F21V 7/04* (2013.01); *F21S 8/086* (2013.01); *F21V 3/00* (2013.01); *F21V 21/26* (2013.01);
(Continued)

(58) Field of Classification Search
USPC .......................................................... 362/235
See application file for complete search history.

(56) References Cited

U.S. PATENT DOCUMENTS

| 4,107,770 A | 8/1978 | Weber |
| 4,353,009 A | 10/1982 | Knoll |

(Continued)

OTHER PUBLICATIONS

Illuminating Engineering Society of North America, IES RP-6-15, "Sports and Recreational Area Lighting", Appendix A, 5 pages, copyright Mar. 30, 2015.

(Continued)

*Primary Examiner* — Michael G Lee
*Assistant Examiner* — David Tardif
(74) *Attorney, Agent, or Firm* — Jessica R. Boer

(57) ABSTRACT

As lighting systems age the need for retrofits—namely where newer lighting technology is used to replace older or different technology, but where a direct replacement is not possible without some kind of modification to the rest of the lighting system—increases. The residential lighting retrofit market is well established with a one-for-one light source replacement approach that is widely embraced; for example, a table lamp with a failed incandescent bulb can be readily replaced with an LED bulb despite the disparate power requirements because of the onboard driver system, and this avoids having to modify the lamp itself, the outlet, incoming power, etc. No such solution exists for specialized lighting systems such as sports and wide area lighting systems. The present invention is directed to such a solution, and one which is cost effective, easy to implement, and customizable to meet the varying site requirements of such specialized systems.

20 Claims, 47 Drawing Sheets

(51) Int. Cl.
*F21V 23/00* (2015.01)
*F21V 3/00* (2015.01)
*F21V 29/76* (2015.01)
*F21S 8/08* (2006.01)
*F21W 131/105* (2006.01)
*H05B 33/08* (2006.01)
*H05B 37/02* (2006.01)
*F21Y 115/10* (2016.01)

(52) U.S. Cl.
CPC ............ *F21V 23/001* (2013.01); *F21V 29/76* (2015.01); *F21W 2131/105* (2013.01); *F21Y 2115/10* (2016.08); *H05B 33/0809* (2013.01); *H05B 33/0845* (2013.01); *H05B 37/0272* (2013.01)

(56) References Cited

U.S. PATENT DOCUMENTS

| | | | |
|---|---|---|---|
| 4,414,493 | A | 11/1983 | Henrich |
| 4,979,086 | A | 12/1990 | Heinisch |
| 5,274,534 | A | 12/1993 | Armstrong |
| 5,426,577 | A | 6/1995 | Gordin et al. |
| 5,486,989 | A | 1/1996 | Compton |
| 5,600,537 | A | 2/1997 | Gordin et al. |
| 6,078,148 | A | 6/2000 | Hochstein |
| 6,250,596 | B1 | 6/2001 | Gordin et al. |
| 6,250,774 | B1 | 6/2001 | Begemann et al. |
| 7,080,927 | B2 | 7/2006 | Feuerborn et al. |
| 7,209,958 | B2 | 4/2007 | Crookham et al. |
| 7,387,403 | B2 | 6/2008 | Mighetto |
| 7,600,901 | B2 | 10/2009 | Gordin et al. |
| 7,688,007 | B2 | 3/2010 | Gordin et al. |
| 7,766,518 | B2 | 8/2010 | Piepgras et al. |
| 7,843,144 | B2 | 11/2010 | Gordin et al. |
| 7,848,079 | B1 | 12/2010 | Gordin et al. |
| 7,976,198 | B1 | 7/2011 | Gordin et al. |
| 8,154,218 | B2 | 4/2012 | Gordin et al. |
| 8,163,993 | B2 | 4/2012 | Gordin et al. |
| 8,322,881 | B1 | 12/2012 | Wassel |
| 8,337,058 | B2 | 12/2012 | Gordin et al. |
| 8,449,144 | B2 | 5/2013 | Boxler et al. |
| 8,717,552 | B1 | 5/2014 | Gordin et al. |
| 8,729,809 | B2 | 5/2014 | Kit et al. |
| 8,770,796 | B2 | 7/2014 | Gordin et al. |
| 8,789,967 | B2 | 7/2014 | Gordin et al. |
| 9,402,292 | B1 | 7/2016 | Gordin et al. |
| 9,435,517 | B2 | 9/2016 | Gordin et al. |
| 9,631,795 | B2 | 4/2017 | Gordin et al. |
| 2011/0141734 | A1* | 6/2011 | Li .............................. F21V 5/04 362/235 |
| 2011/0149582 | A1 | 6/2011 | McKee |
| 2011/0199765 | A1* | 8/2011 | Simons ................. F21V 7/0008 362/235 |
| 2014/0092593 | A1 | 4/2014 | Gordin et al. |
| 2015/0308655 | A1* | 10/2015 | Holmes ................... F21V 5/045 362/235 |
| 2015/0362132 | A1* | 12/2015 | McCane ................... F21K 9/90 362/235 |
| 2016/0010804 | A1* | 1/2016 | Barnetson ............... F21K 9/232 362/235 |

OTHER PUBLICATIONS

GE Lighting, "GE LED replacement lamp for 400 watt HID", 2 pages, copyright 2015.
Hylite LED Lighting LED Omni-Cob, "High Performance LED Omni-Cob Bulb, 200W", 2 pages, copyright 2016.
Lunera, "Lunera Ballasted Technology and Ballast Life", 3 pages, copyright 2015.
Lunera, Lunera Susan Lamp, "LED Replacement for Metal Halide Lamp", 4 pages, copyright 2015.
Pearson, Mark, EE Times, "Current Limiting Key to Hot-Swap Circuit Protection", 6 pages, Sep. 18, 2002.
Horowitz, et al., "The Art of Electronics", Cambridge University, Second Edition, Chapter 14, pp. 940-941, published 1989.

* cited by examiner

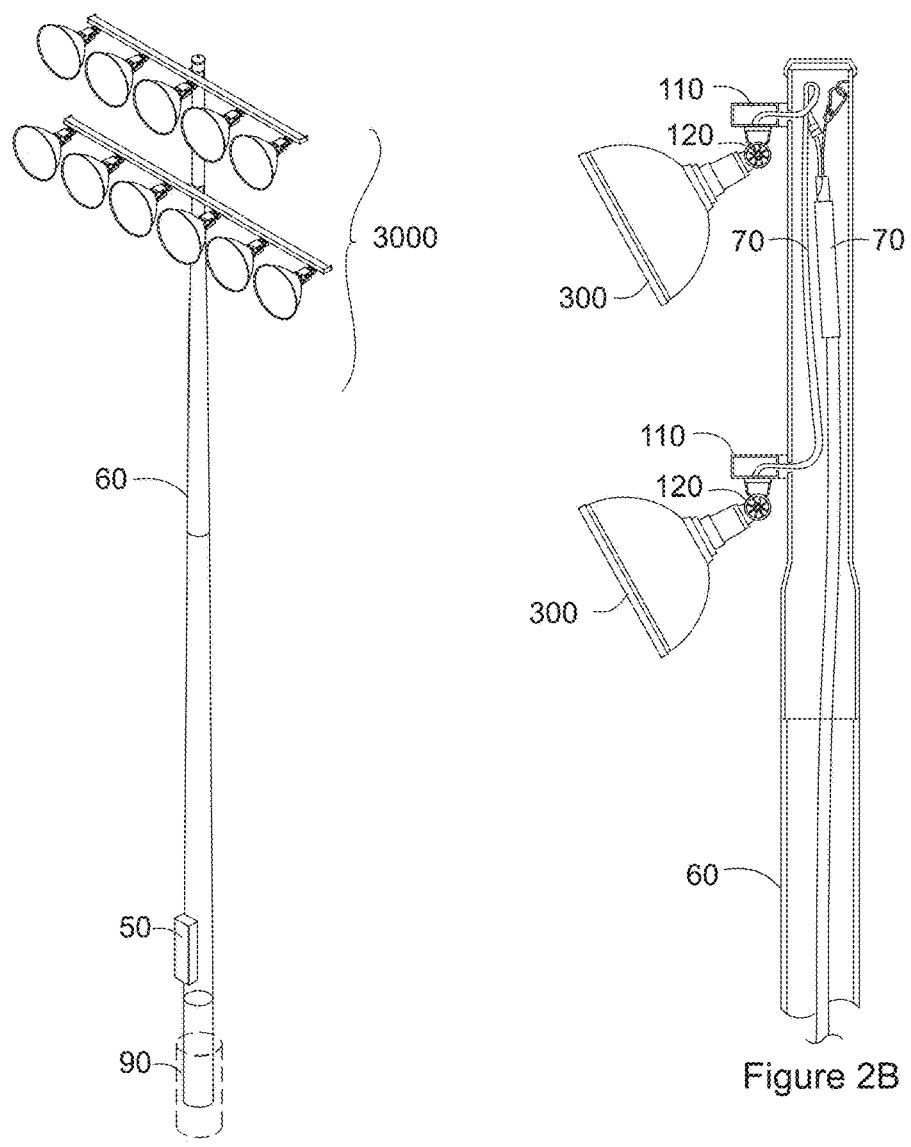
Figure 2A
Figure 2B
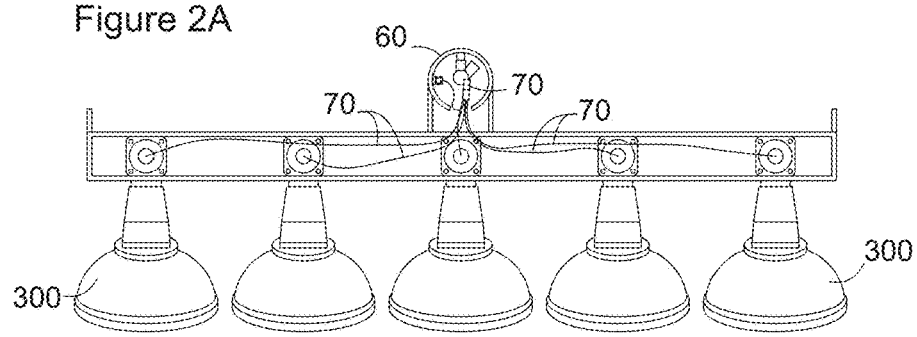
Prior Art
Figure 2C

Section A

Section B

Section View

Section View

US 10,337,693 B1

APPARATUS METHOD, AND SYSTEM FOR COST-EFFECTIVE LIGHTING SYSTEM RETROFITS INCLUDING LED LUMINAIRES

CROSS-REFERENCE TO RELATED APPLICATIONS

This application claims priority under 35 U.S.C. § 119 to provisional U.S. application Ser. No. 62/522,345, filed Jun. 20, 2017, and 62/457,641, filed Feb. 10, 2017, both of which are hereby incorporated by reference in their entirety.

I. TECHNICAL FIELD OF INVENTION

The present invention generally relates to lighting system retrofits; namely, when newer lighting technology (e.g., LEDs) is used to replace older or different technology (e.g., HID), but where a direct replacement is not possible without some kind of modification to the rest of the lighting system. The present invention also relates to minimizing the cost of lighting system retrofits by minimizing modification to non-lighting technology portions of the lighting system such as poles, enclosures, wiring, and crossarms. More specifically, the present invention relates to apparatuses and methods for providing cost-effective lighting system retrofits wherein the newer lighting technology provides at least comparable light levels and, for at least some systems with older lighting technology, also offers an improvement to glare control.

II. BACKGROUND OF THE INVENTION

Direct replacement of a light source generally occurs when an existing—usually failed—light source is replaced with another having similar power regulating and connection means. For example, the light source of a residential lighting fixture (e.g., table lamp) may include a failed 60 W incandescent bulb which is replaced with a 100 W incandescent bulb—this is not a retrofit situation. A retrofit situation occurs when the light source being replaced is somehow different from the light source replacing it; most typically in terms of power requirements. Take, for example, that same table lamp in which the failed 60 W incandescent bulb is instead replaced with a 15 W LED bulb (which has a comparable light output to a 100 W incandescent bulb); the latter requires an onboard driver system so to adapt the available AC to the DC power requirements of the LED source, and is an example of a retrofit situation. However, it should be noted that the above example is a simple retrofit situation—the disparate power requirements are resolved without any other modification to the rest of the lighting system—and that there are other more complex lighting retrofit situations which lack such an elegant solution widely embraced by the market.

Take, for example, specialized lighting systems such as sports or wide area lighting systems. Unlike the example of a table lamp, there are no standard bulb shapes or sizes, no standard bulb base, no standard incoming power. On the contrary, all of these features can differ from site to site and manufacturer to manufacturer. For example, a site might have 480 incoming voltage or 240 incoming voltage, incoming power might be three-phase or one-phase, the existing lighting system might be a mix of HID lamps and sodium lamps of varying sizes and shapes, and the like. Lighting technology aside, power regulating means, connection means, and the aforementioned non-lighting technology portions of the existing lighting system such as poles, enclosures, wiring, and crossarms could also differ. As one example, an existing lighting system could include a solid wood pole with exposed wiring or a hollow steel pole with internal wiring. As another example, poles might be bolted to a plate on the ground, buried in the ground, or attached to some other feature in the lighting system (e.g., a truss system).

Therefore, it may be appreciated that the one-for-one replacement approach in the residential lighting retrofit market—namely, old light source out, new light source in, no other changes required—while appealing, is likely impractical for the specialized lighting retrofit market.

That being said, to date some manufacturers have attempted to take the one-for-one replacement approach in specialized lighting system retrofits; these efforts have largely been met with serious issues. For example, some manufacturers attempt to retain existing crossarms—even when one-for-one retrofit fixtures do not fit in the existing crossarm footprint. Doing so restricts the range of achievable horizontal and vertical aiming of retrofit fixtures, and often results in dark spots at the target area thereby compromising lighting uniformity. Some manufacturers drill new holes in existing crossarms to accommodate the footprint of one-for-one retrofit fixtures. Doing so often results in weakening of the crossarm, as well as introducing additional locations for moisture ingress, thereby compromising wiring and potentially increasing corrosion.

Even still, there is a market for retrofitting specialized lighting systems. Sports fields, for example, are in play for many years past the useful life of an older lighting technology, and often some components (e.g., poles, ballasts) still have useful life. Therefore, there is a need for a modified approach to the one-for-one retrofit solution already widely embraced by the residential lighting retrofit market; namely, one that takes into account the unique requirements of specialized lighting systems by retrofitting older or different lighting technology with newer technology while minimizing modification to non-lighting technology portions of the lighting system such as poles, enclosures, wiring, and crossarms where such is feasible and cost effective.

Thus, there is room for improvement in the art.

III. SUMMARY OF THE INVENTION

In the residential lighting market, retrofit solutions are simple and already well established; one can readily upgrade a failed incandescent bulb in a table lamp with an LED bulb with no other modification to the table lamp, wall outlet, or power delivered to the house (despite disparate power requirements between incandescent and LED light sources). However, the ease and elegance of a one-for-one replacement of light source is not so readily achieved in specialized lighting retrofit markets such as sports and wide area lighting; this is due, at least in part, to wide variations in luminaire design, available site power, and other portions of the existing lighting systems which ultimately preclude an established retrofit solution widely embraced by the market.

Furthermore, in a retrofit situation some portions of existing specialized lighting systems are in need of replacement—aside from the lighting technology itself—whereas others are not, and this can vary from site to site. For example, any specialized lighting system retrofit wherein the existing system uses solid wood poles with exposed wiring will likely have the pole replaced; this is irrespective of the new lighting technology or older lighting technology being replaced. Wooden poles absorb moisture, warp and twist over time, and exposed wiring is a shock hazard—this is well known in the art of lighting. However, other portions of the existing lighting system—such as robust, long-life ballasts—could be preserved in a retrofit situation so to present a cost-effective solution, if somehow said ballasts could be modified to meet the disparate power requirements of the newer lighting technology.

It is therefore a principle object, feature, advantage, or aspect of the present invention to improve over the state of the art and/or address problems, issues, or deficiencies in the art.

Envisioned are apparatus, method, and system for an LED-based retrofit lighting system, said system being particularly designed for the specialized lighting market (though not limited to such). Unlike state-of-the-art approaches to providing one-for-one retrofit fixtures which result in reduced light levels, lack of glare control, or loss of integrity of lighting system components, the present invention seeks to (i) retrofit only that which is needed and can be done without compromising the overall light or lighting system, and (ii) minimize modification to non-lighting technology portions of the lighting system so to (iii) provide a cost-effective LED retrofit solution. Furthermore, the present invention seeks to provide tools to lighting designers and more generally those involved with retrofitting lighting systems to (i) more effectively reconcile disparate power requirements, and (ii) more effectively address varying lighting conditions at a target area in a manner that does not exceed capacity or otherwise compromise portions of the existing lighting system.

Further objects, features, advantages, or aspects of the present invention may include one or more of the following:
  a. a retrofit solution that preserves most of the existing lighting system below luminaire level when reconciling disparate power requirements;
  b. a retrofit solution that requires little or no rewiring of existing power regulating or connection means;
  c. a retrofit solution that provides comparable or better light levels and glare control than at least some older lighting technologies; and
  d. a retrofit solution that is easy to implement insomuch that newer lighting technology may be pre-aimed and thereby provide adequate lighting conditions from the point of installation.

An apparatus according to one aspect of the present invention comprises retrofit power regulating and connection means. According to at least one embodiment, one or more devices is placed in the electrical path between an existing HID lighting system ballast and an LED retrofit luminaire so to reconcile disparate power requirements, said one or more devices comprising a number of solid state devices which when taken together (i) approximates the function of a basic LED driver, (ii) has better reliability or fewer failures than a traditional LED driver, (iii) is adapted for high power applications, and (iv) is significantly less costly than a basic LED driver.

A further apparatus according to one aspect of the present invention comprises retrofit LED luminaires. According to at least one embodiment, a modular or otherwise customizable LED retrofit fixture may be sized to allow full horizontal and vertical pivoting within an existing crossarm footprint while (i) not exceeding loading capacity of the existing lighting system, and (ii) minimizing modification to non-lighting technology portions of the lighting system. In at least one alternative embodiment, a plurality of retrofit LED luminaires may be pre-aimed and affixed to a retrofit crossarm—the overall array designed to stay below the loading capacity of the existing lighting system—so to aid in the ease of installation.

A method according to at least one aspect of the present invention comprises retrofitting an HID (or other AC lighting technology) lighting system with an LED (or other DC lighting technology) lighting system, said LED retrofit lighting system designed to fit in the existing crossarm footprint (taking into account aiming), arranging LED light sources in a housing of said retrofit luminaire for favorable beam design (taking into account needed light levels), and including some number of light redirecting devices (taking into account needed glare control) so to present a specialized lighting system retrofit which (i) preserves or improves glare control, and (ii) provides comparable, better, and/or more useful light output as compared to the existing lighting system. Better light output could include light levels in a retrofit system which exceed that in the existing lighting system, can exceed that which is possible in an existing lighting system, is comparable to that in an existing lighting system but which also offers some other benefit (e.g., longer life, higher efficacy, better color rendering), or otherwise.

These and other objects, features, advantages, or aspects of the present invention will become more apparent with reference to the accompanying specification and claims.

IV. BRIEF DESCRIPTION OF THE DRAWINGS

From time-to-time in this description reference will be taken to the drawings which are identified by figure number and are summarized below.

FIG. 1 illustrates a typical specialized lighting system; here, a sports lighting system designed to illuminate a sports field and an aerial space above the sports field.

FIG. 2A-C illustrate various enlarged views of portions of the typical sports lighting system of FIG. 1; here including non-lighting technology portions of the lighting system such as poles, enclosures, wiring, and crossarms.

FIG. 3 illustrates a portion of the power regulating and connection means associated with the typical sports lighting system of FIG. 1; here including a complete circuit for a single HID lamp on a single pole (i.e., Pole A).

FIG. 4 diagrammatically illustrates—in a partial electrical circuit symbol form—power regulating and connection means associated with the AC lighting technology (i.e., the HID light source) of FIGS. 1-3.

FIGS. 5A and B diagrammatically illustrate potential physical or photometric interference between fixtures on a common pole which should be avoided during the retrofit design process so to permit full horizontal and vertical pivoting as well as avoiding producing light that is not useful, respectively.

Figure 4:
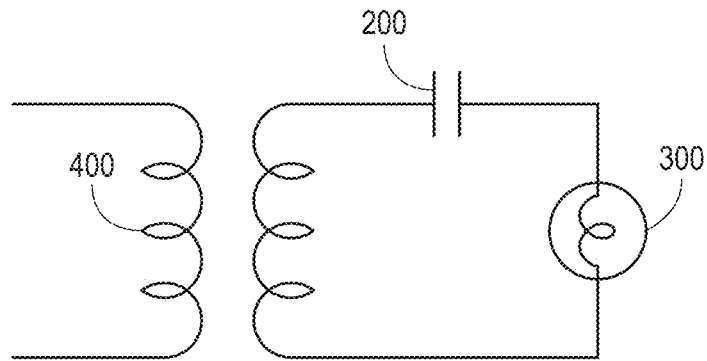
Figure 8:
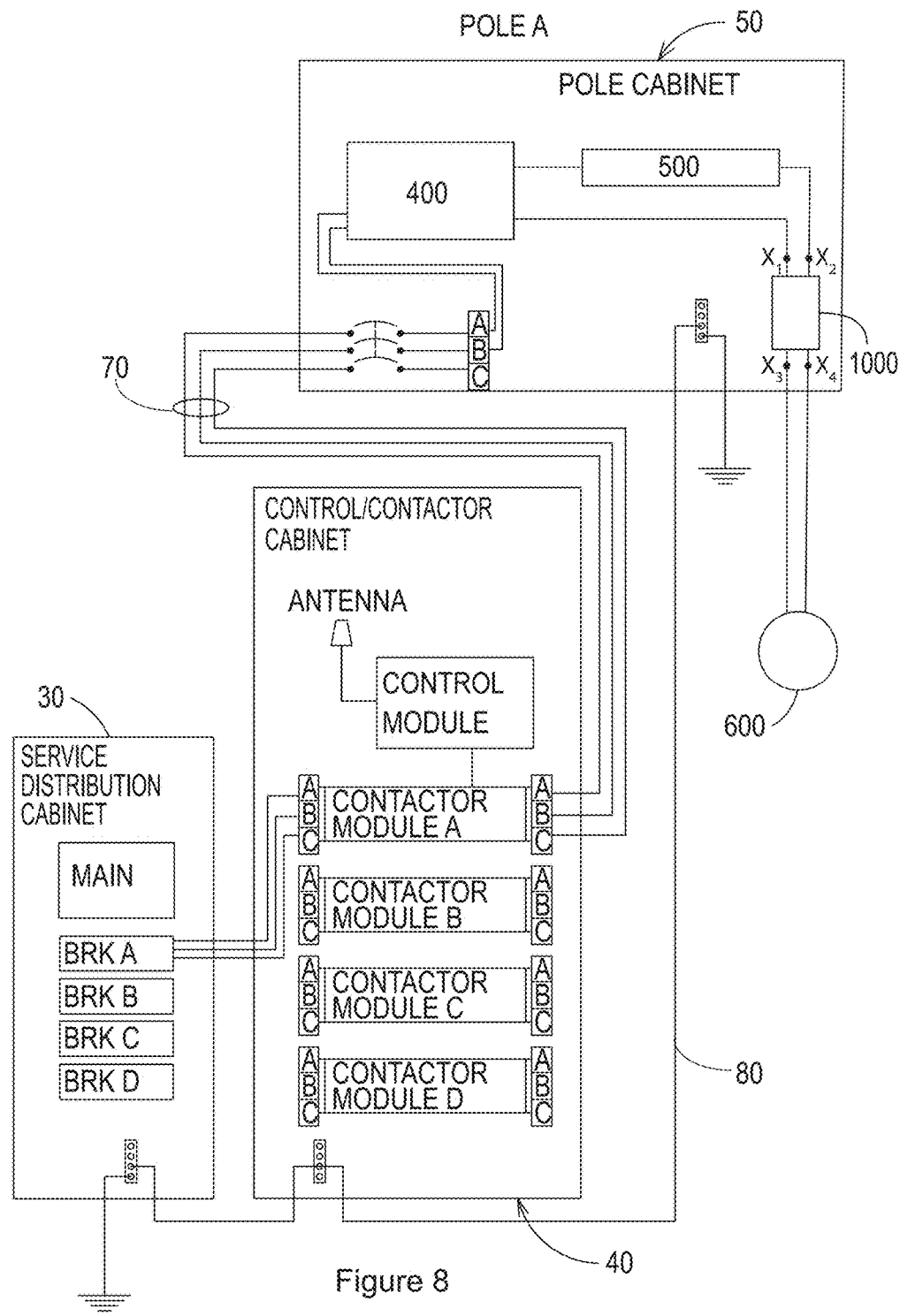
FIG. 8 illustrates a first embodiment of the power regulating and connection means of FIG. 3 as modified according to aspects of the present invention to provide power to a DC light source; here, one or more LEDs.
Figure 9:
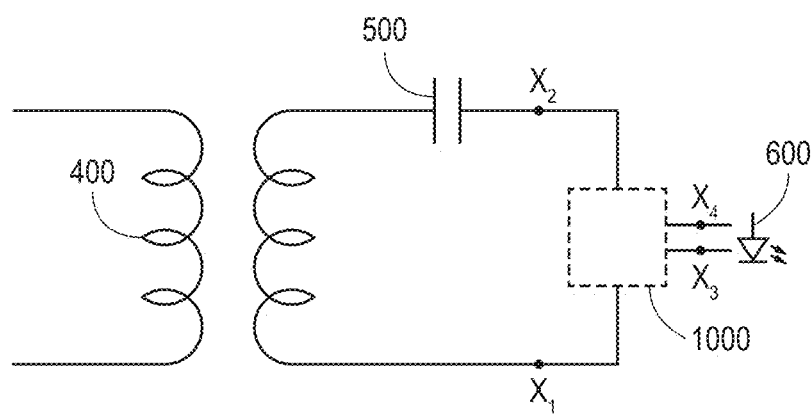

FIG. 9 diagrammatically illustrates—in a partial electrical circuit symbol form—a first embodiment of the power regulating and connection means of FIG. 4 as modified according to aspects of the present invention to provide power to a DC light source in accordance with FIG. 8.

Figure 10:
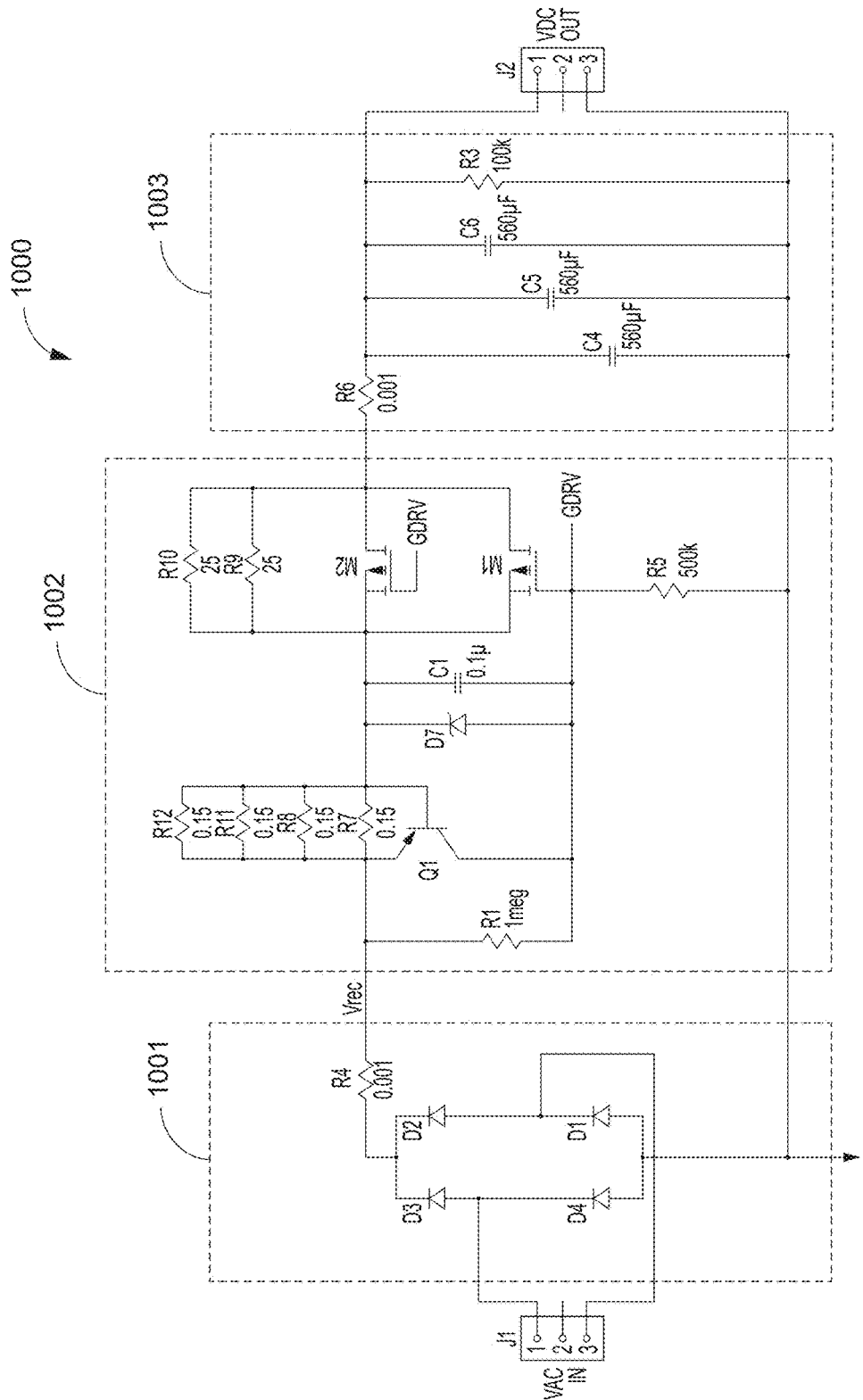

FIG. 10 illustrates in detail the rectifier control circuit of FIGS. 8 and 9.

Figure 6:
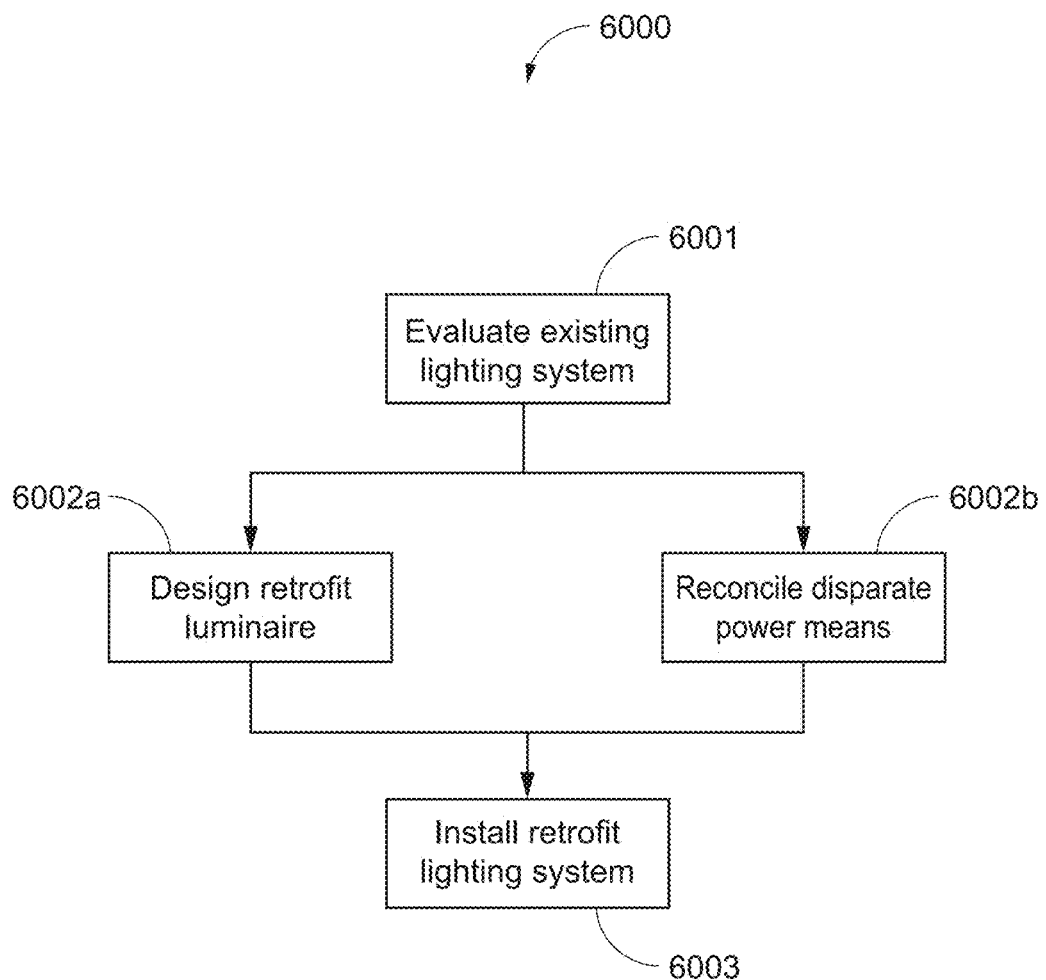
FIG. 6 illustrates one possible method of designing an LED retrofit lighting system according to aspects of the present invention.
Figure 11:
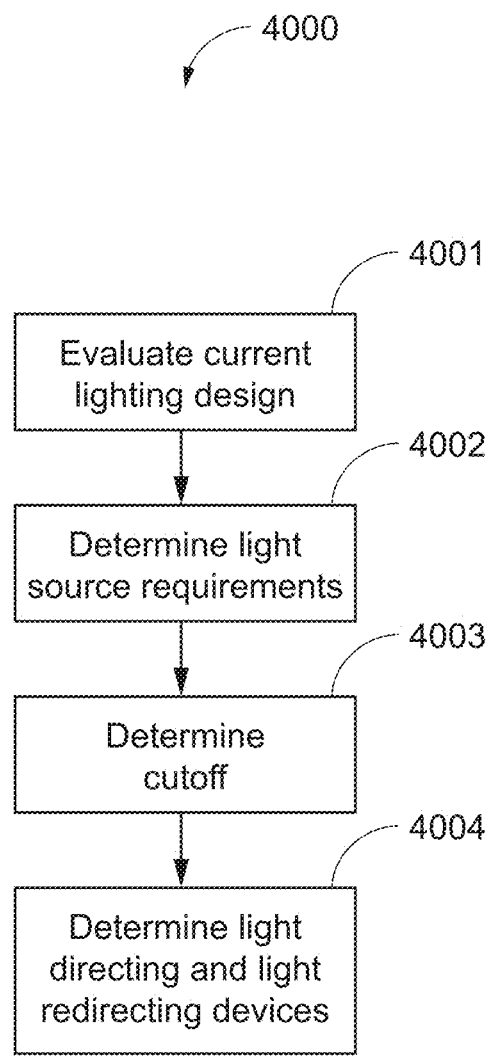

FIG. 11 illustrates one possible method of designing an LED retrofit luminaire according to the method of FIG. 6.

FIGS. 12-20 illustrate various views of a first embodiment of LED retrofit luminaire according to aspects of the present invention.

Figure 12:
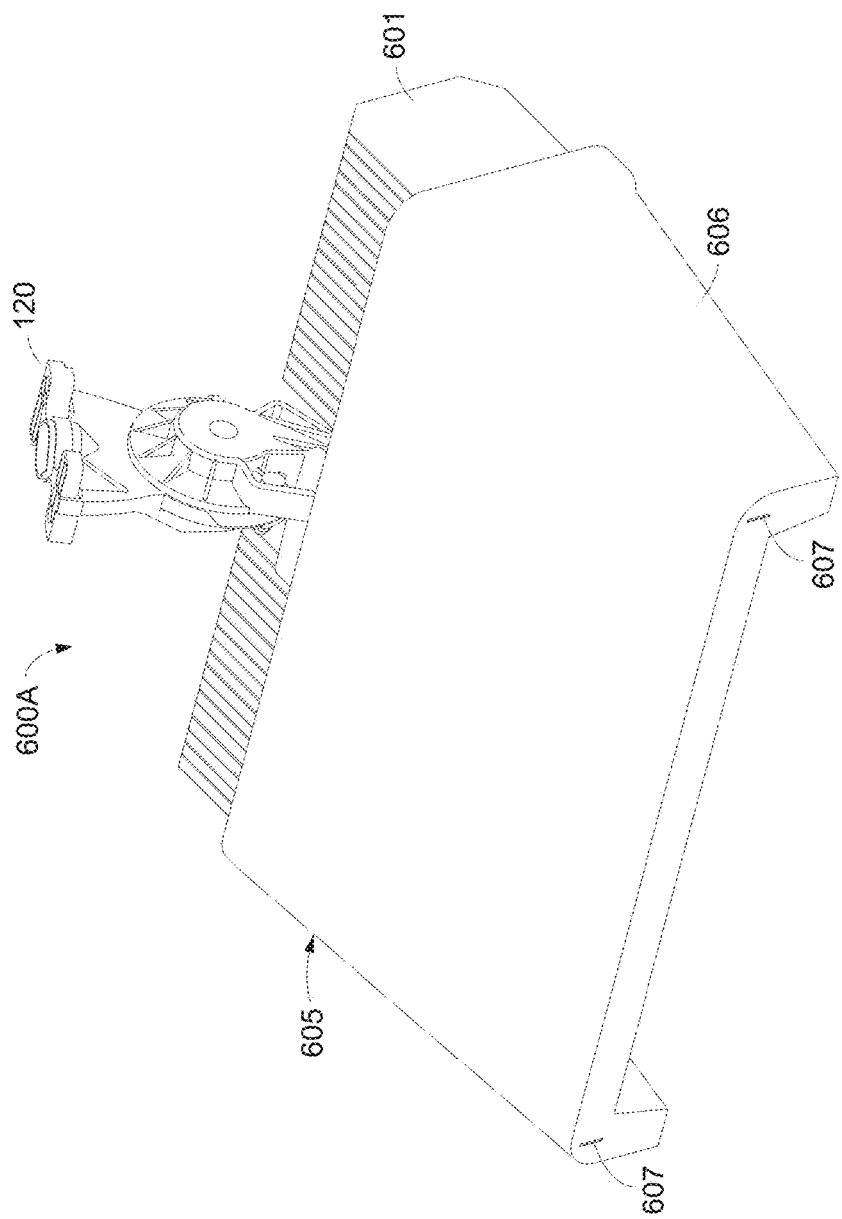
Figure 13:
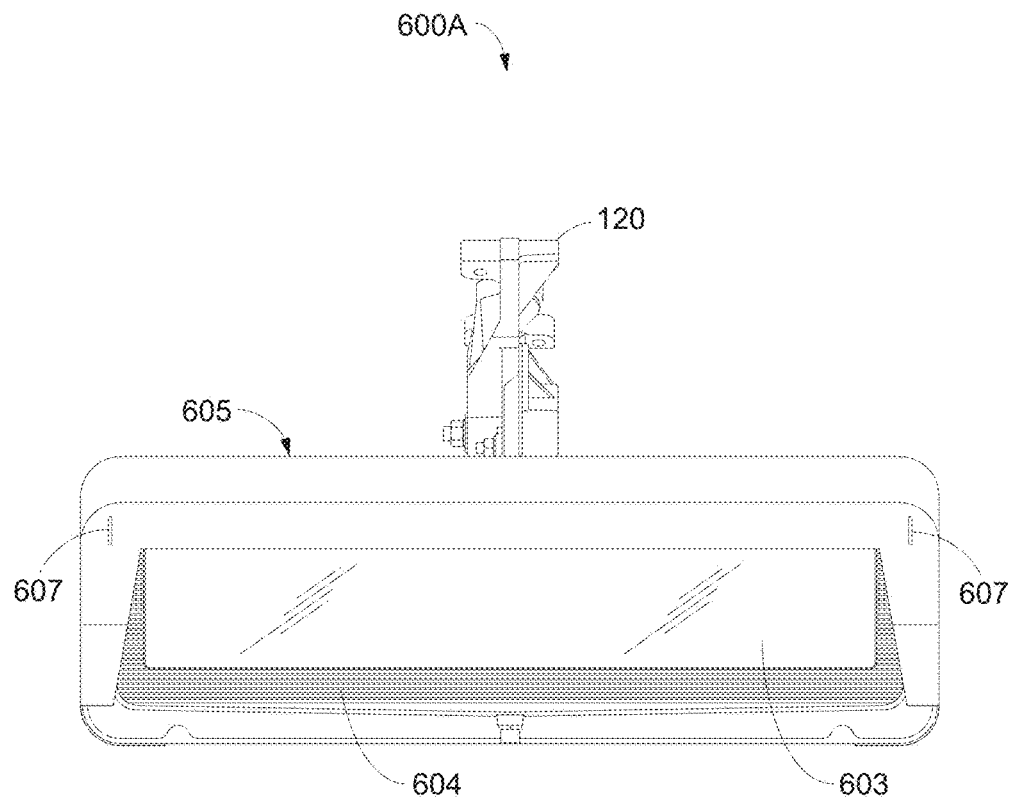
Figure 14:
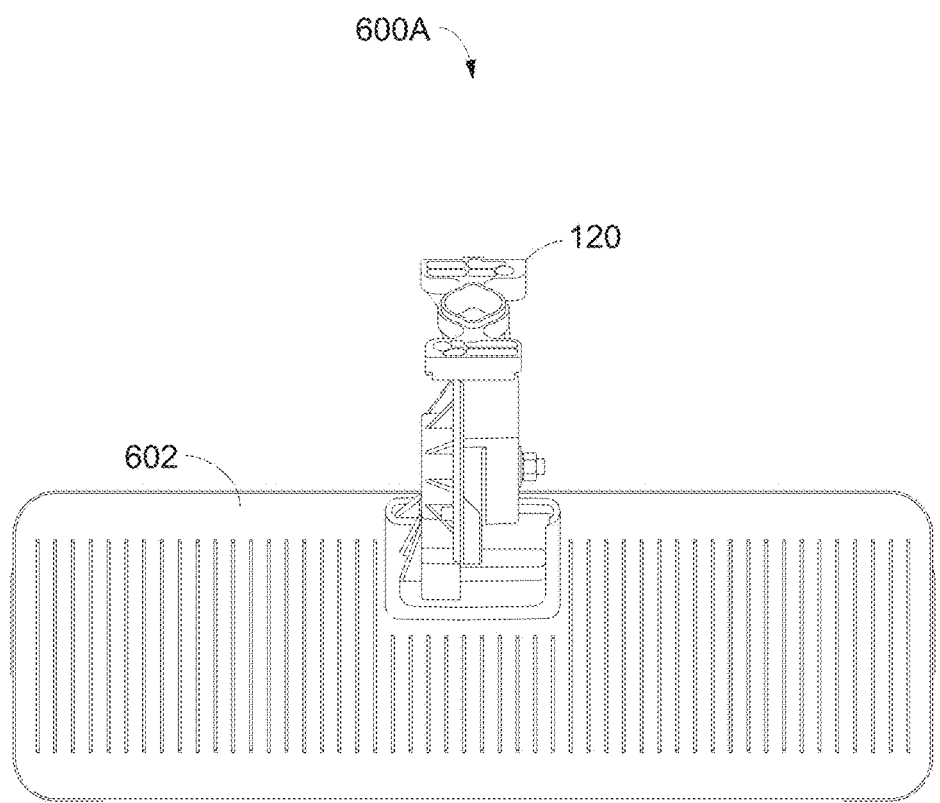
Figure 15:
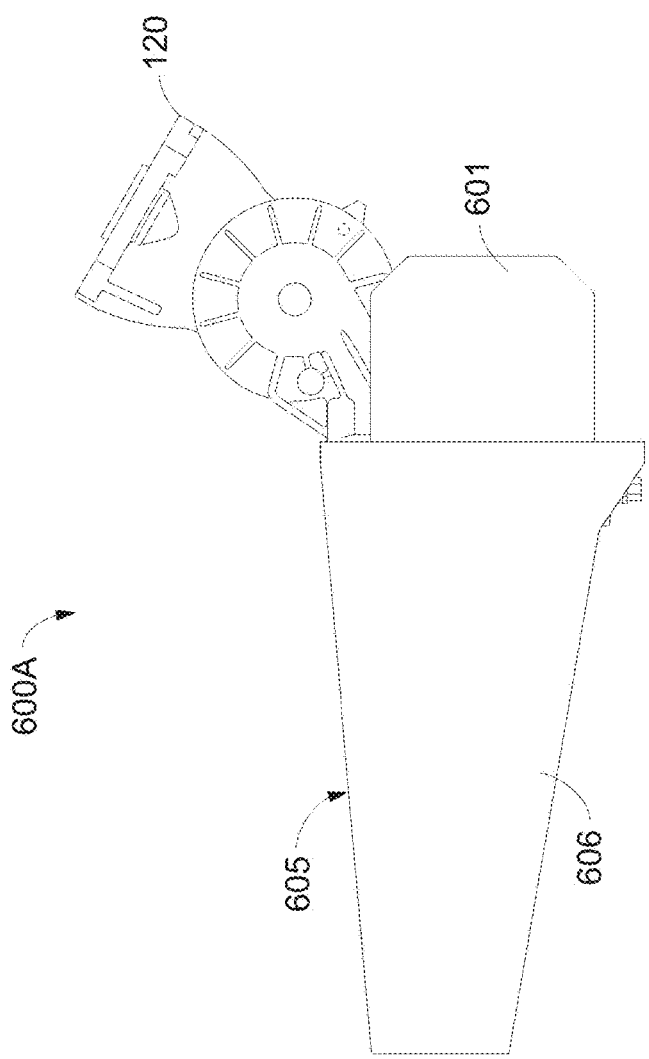
Figure 16:
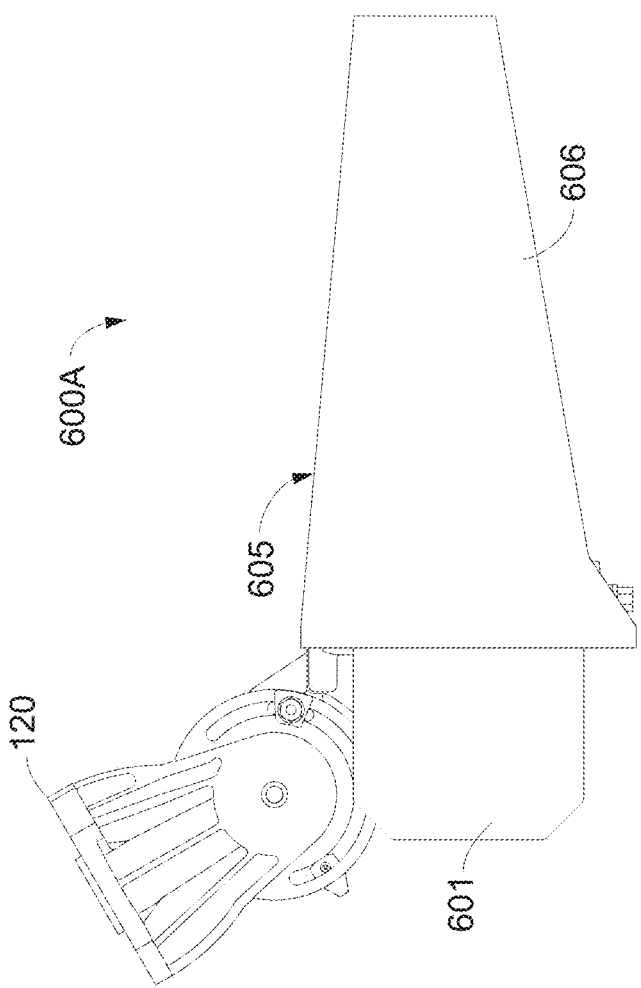
Figure 17:
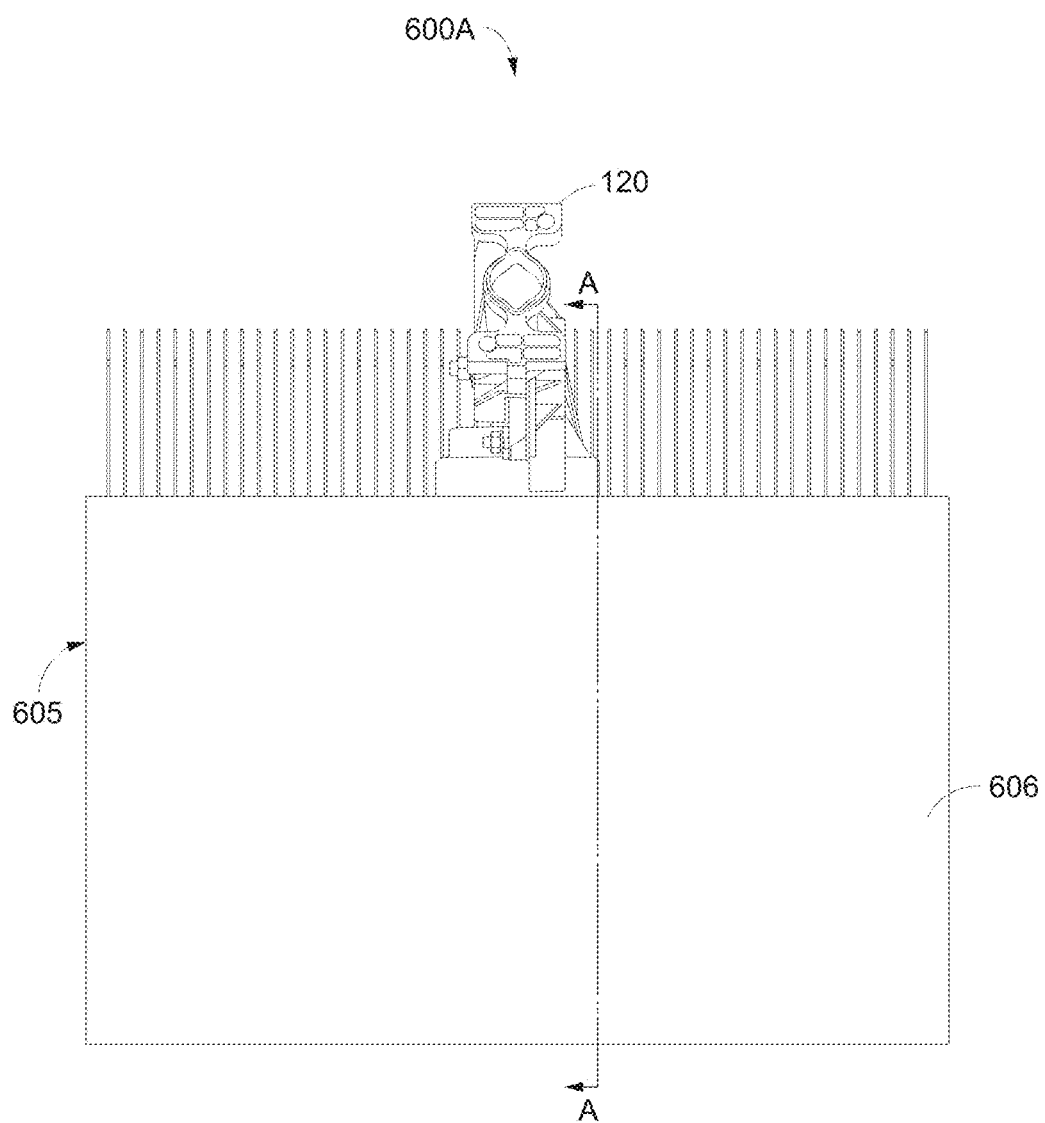
Figure 18:
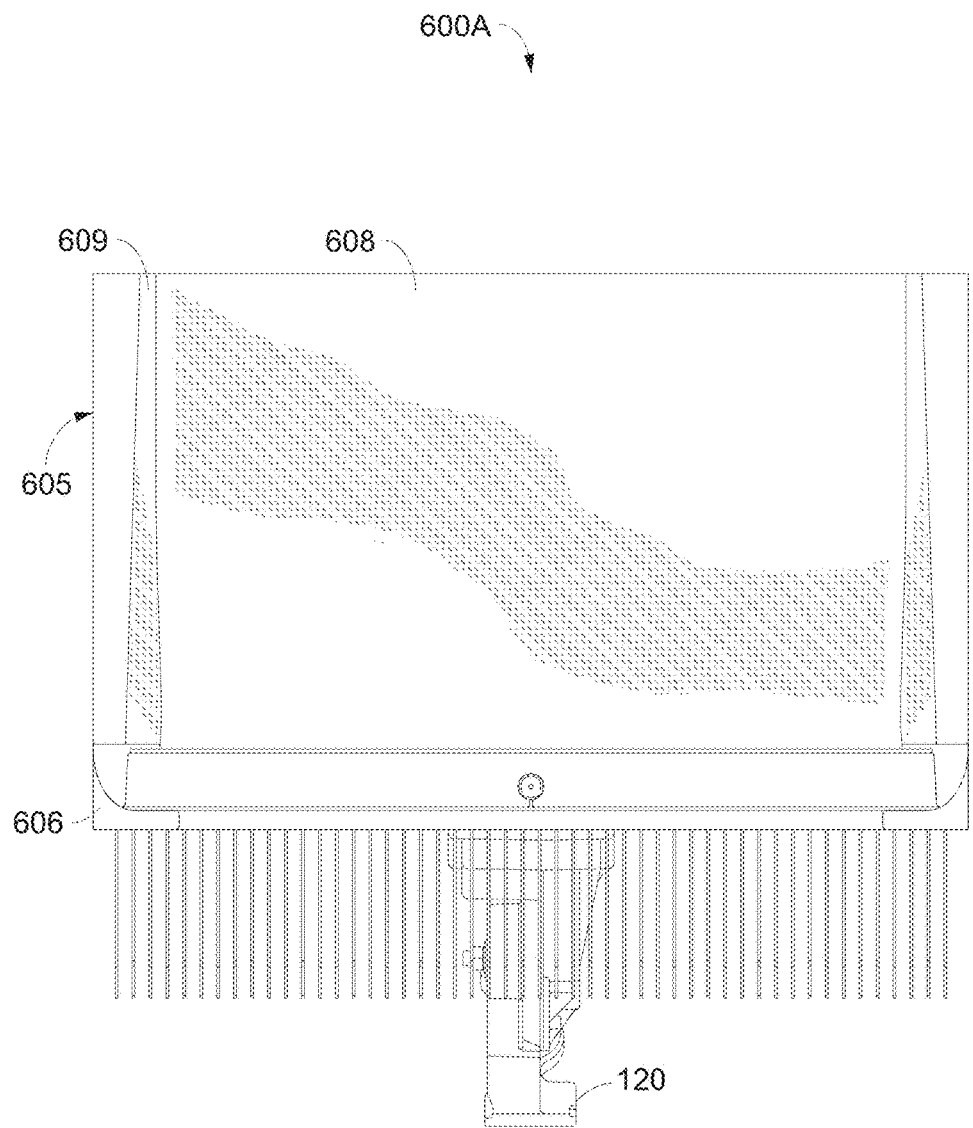

FIG. 12 illustrates a perspective view,

FIG. 13 illustrates a front view,

FIG. 14 illustrates a back view,

FIG. 15 illustrates a right side view,

FIG. 16 illustrates a left side view, FIG. 17 illustrates a top view,

FIG. 18 illustrates a bottom view, and

Figure 19:
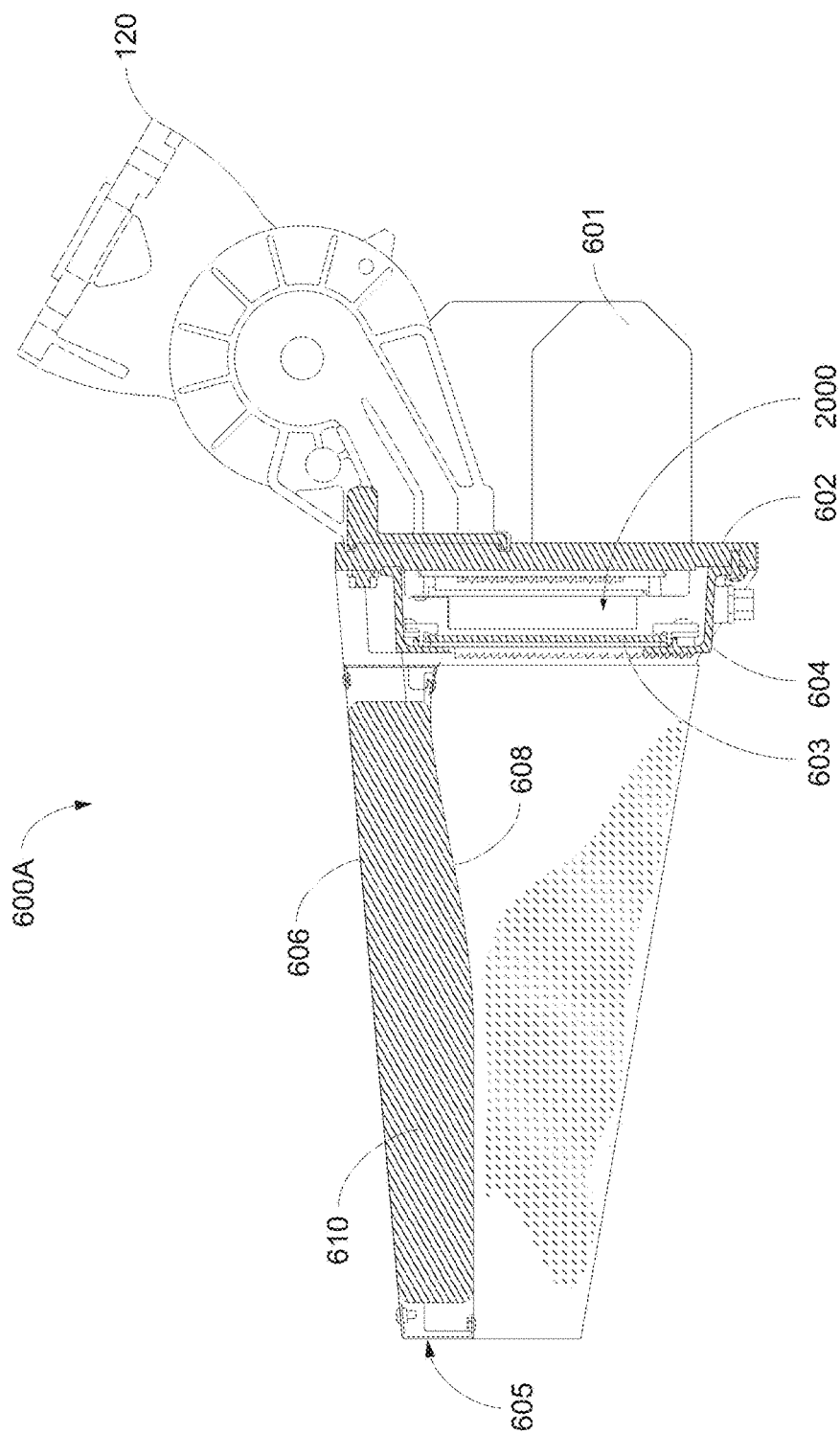

FIG. 19 illustrates an enlarged section view taken along line A-A of FIG. 17; note that for clarity fastening devices are only illustrated in FIG. 17.

Figure 20:
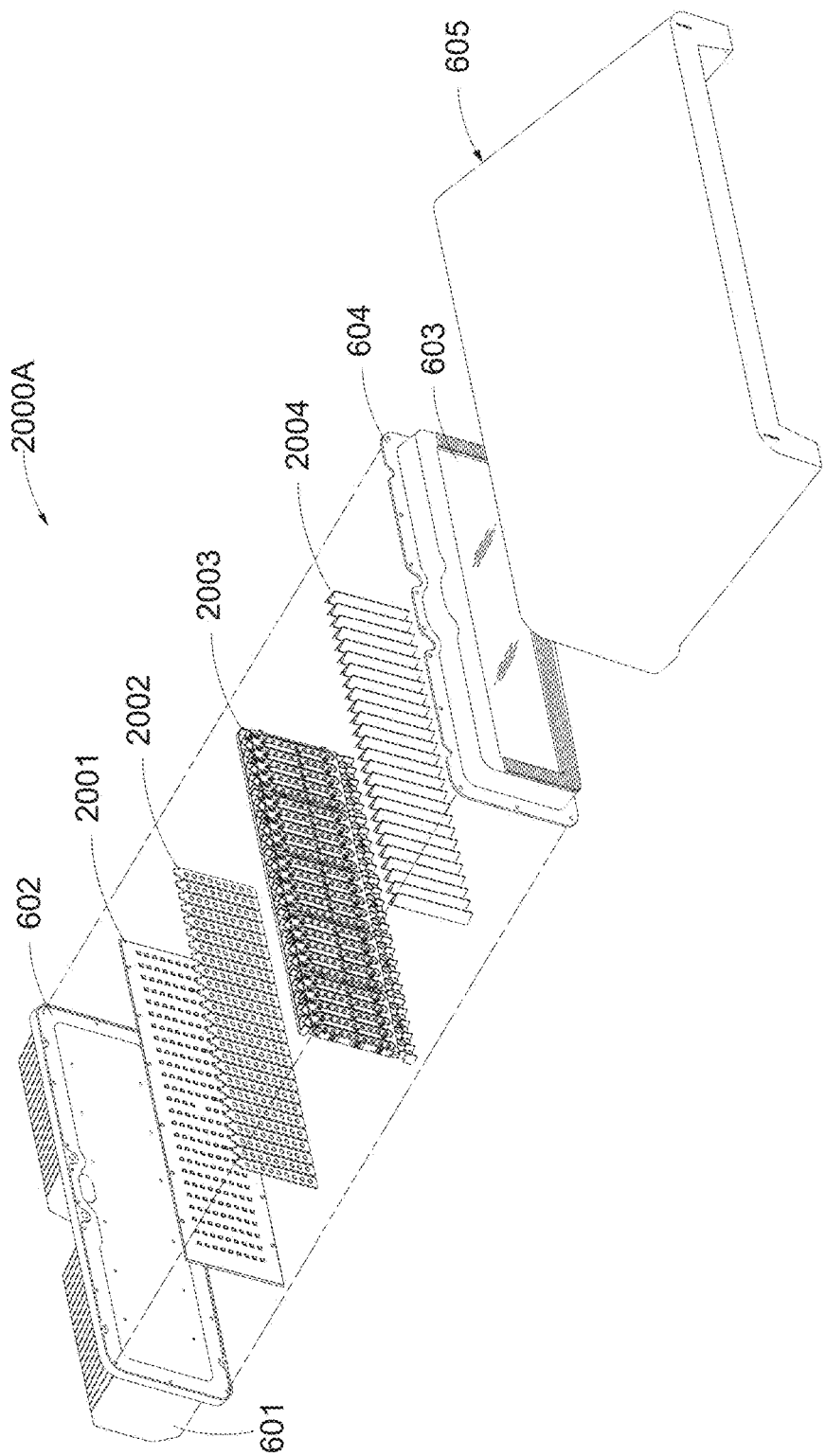

FIG. 20 illustrates a slightly reduced in scale exploded perspective view; here, illustrating a first configuration of light directing and/or light redirecting devices in the internal space of the LED retrofit luminaire and associated with the LEDs. Note that for clarity all fastening devices and electrical connections have been omitted from FIG. 20.

Figure 3:
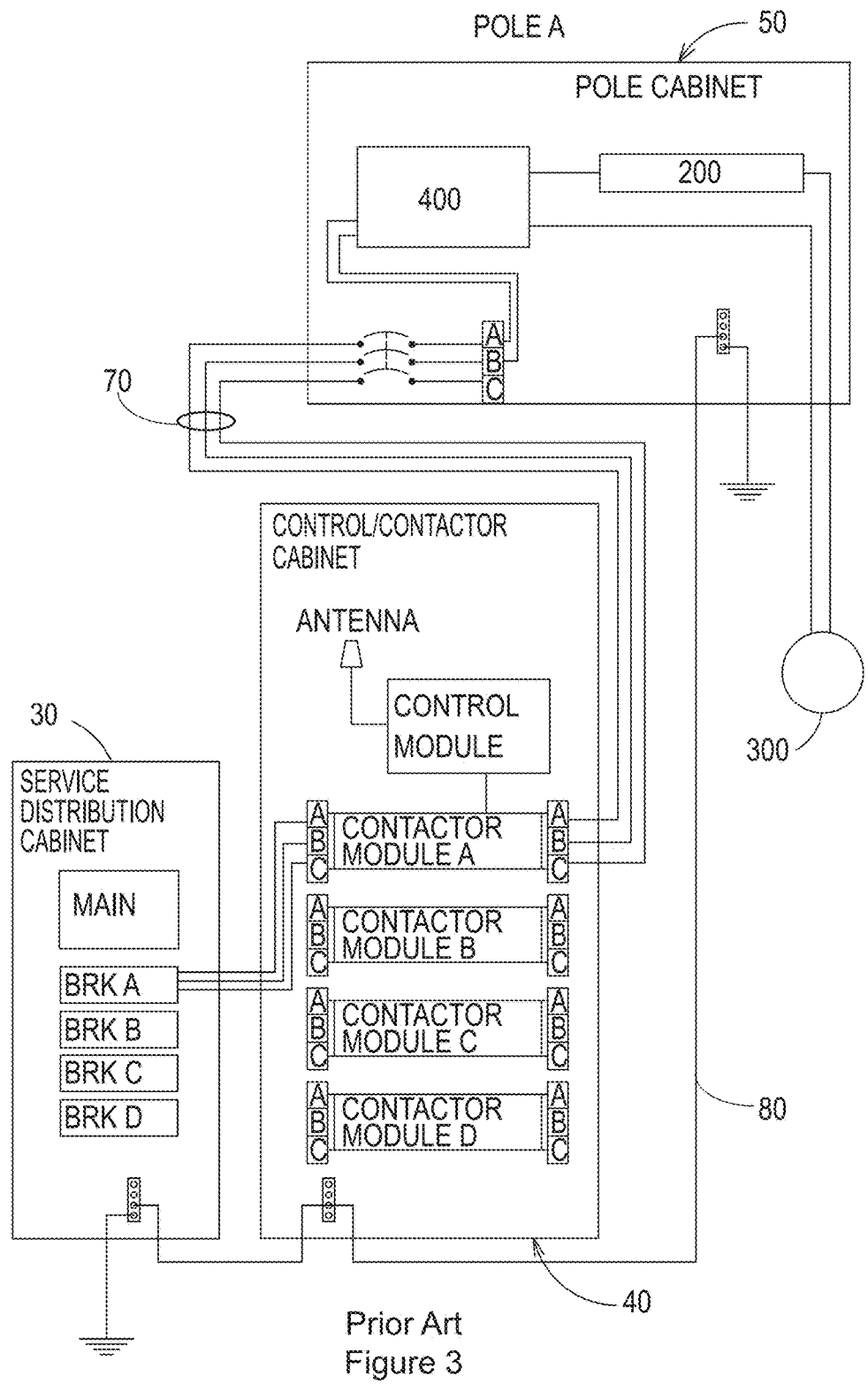
Figure 21:
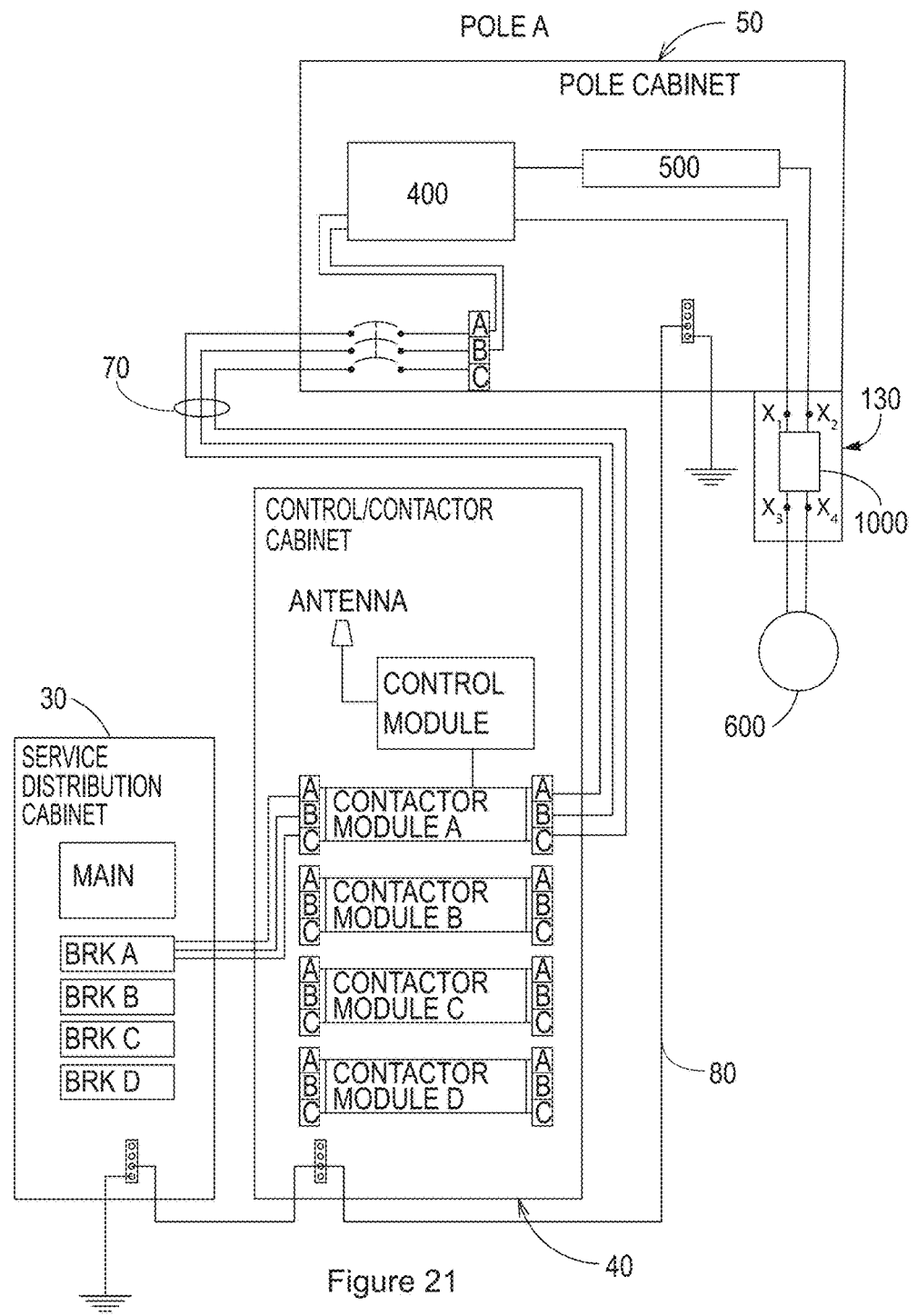

FIG. 21 illustrates a second embodiment of the power regulating and connection means of FIG. 3 as modified according to aspects of the present invention to provide power to a DC light source; here, one or more LEDs.

Figure 1:
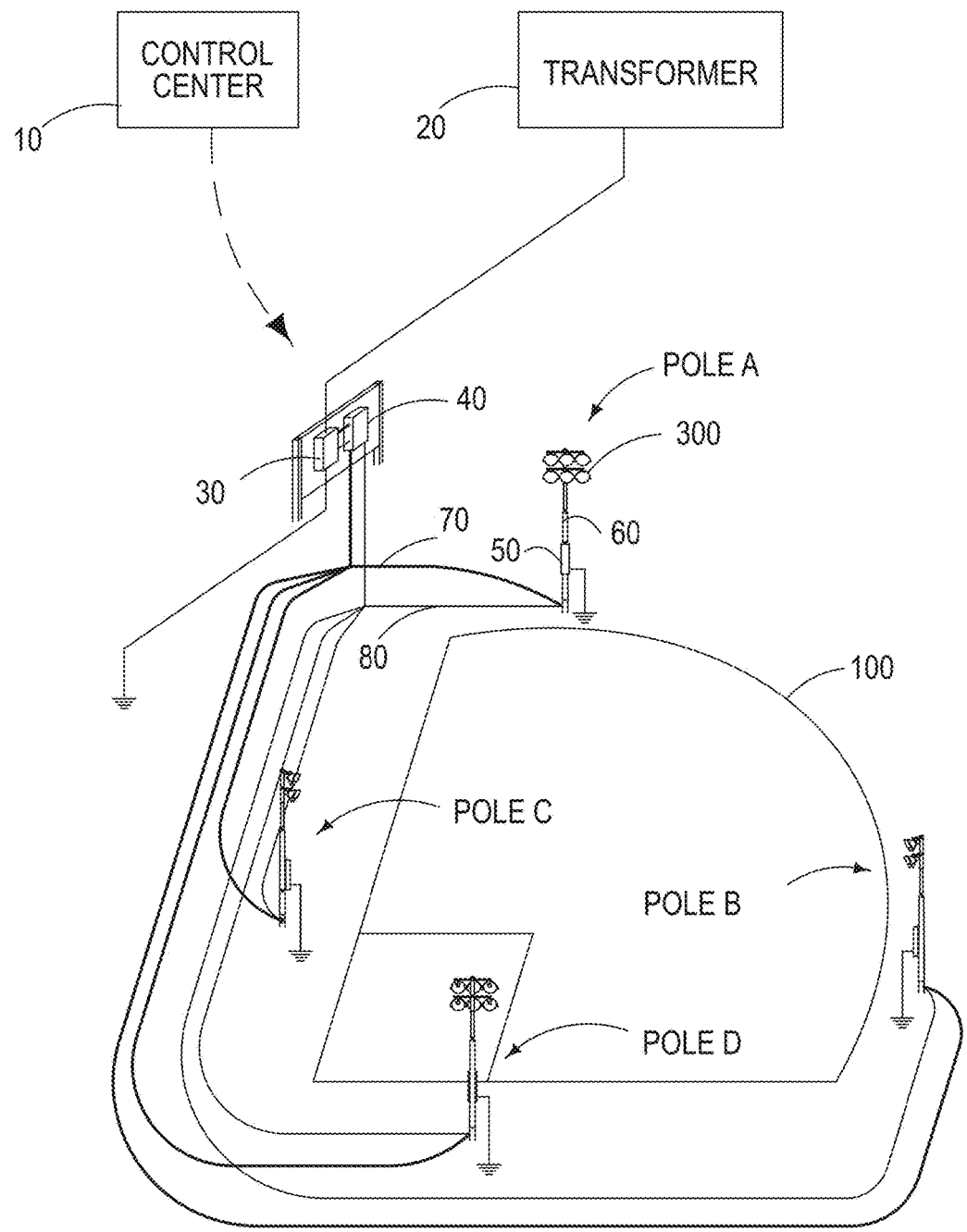
Figure 22:
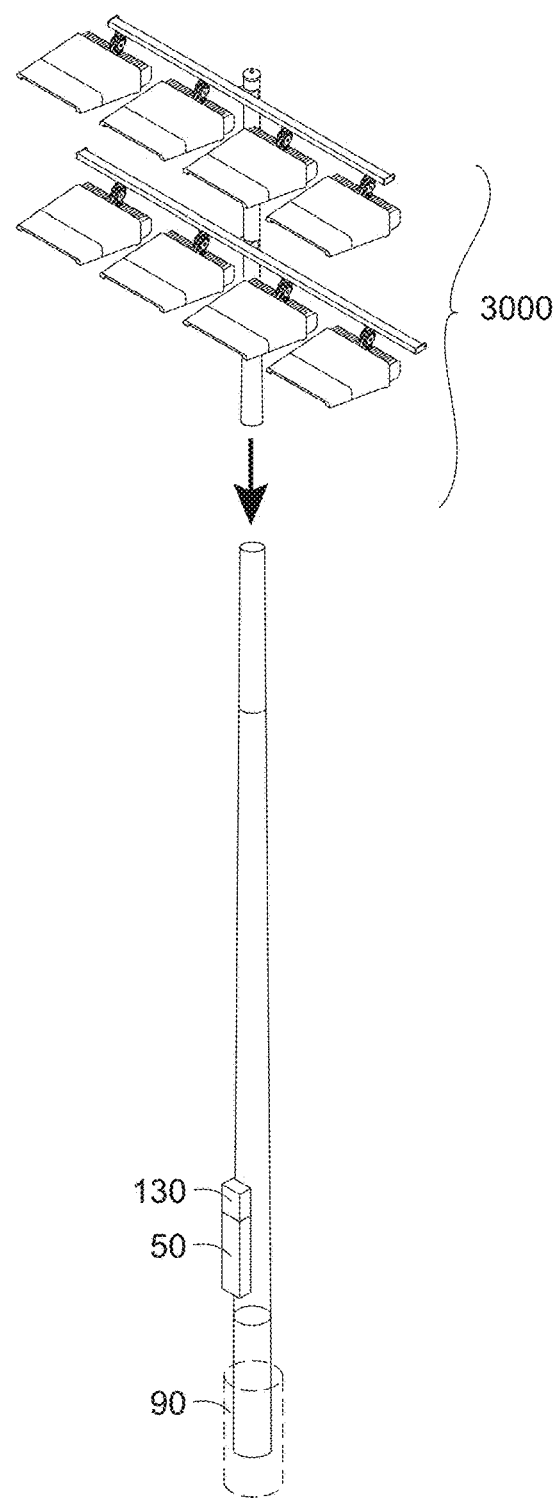

FIG. 22 illustrates the second embodiment of power regulating and connection means of FIG. 21 as implemented in a lighting system such as that in FIG. 1; here, by way of modification to FIG. 2A.

FIGS. 23-30 illustrate various views of a second embodiment of LED retrofit luminaire according to aspects of the present invention.

Figure 23:
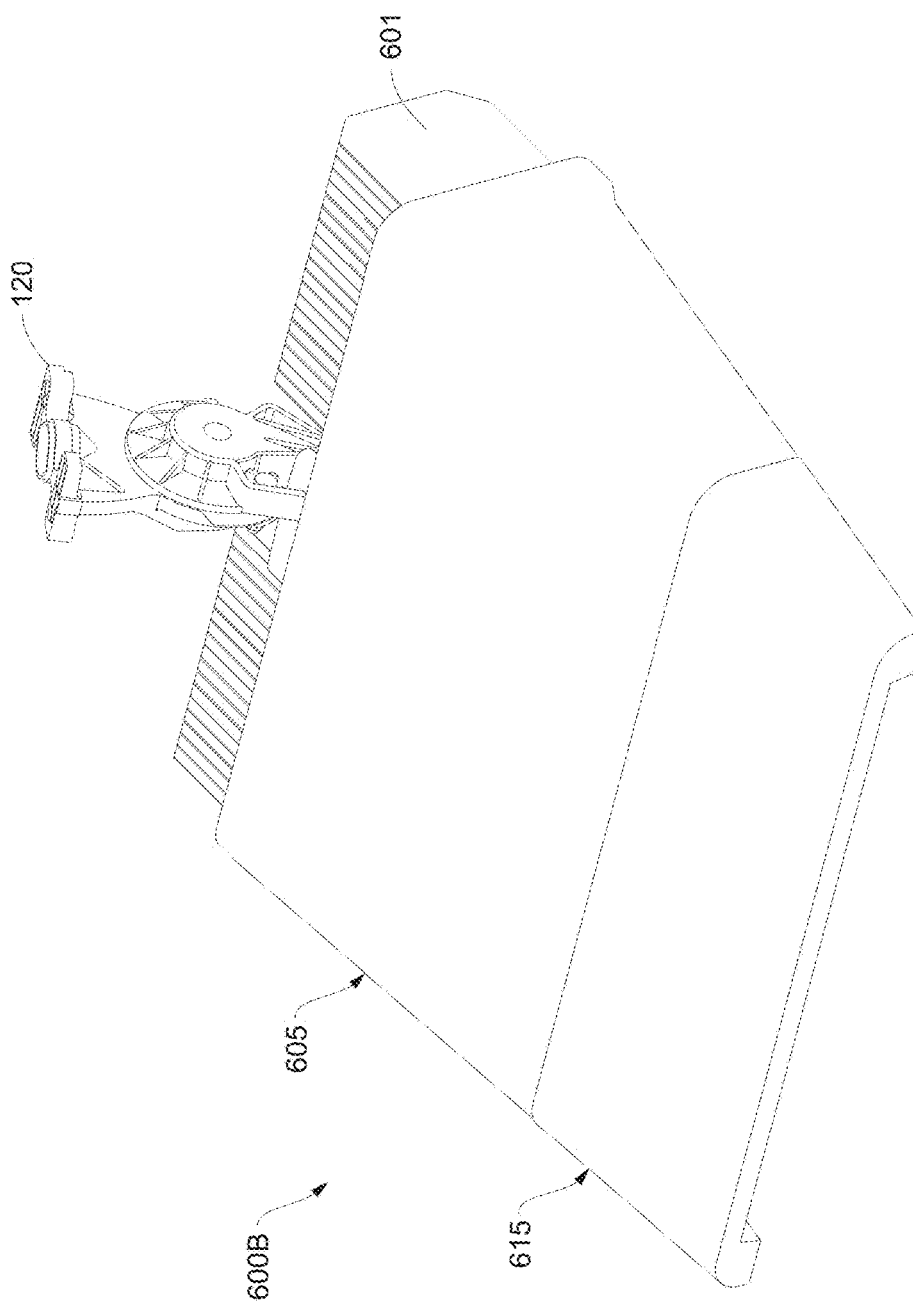
Figure 24:
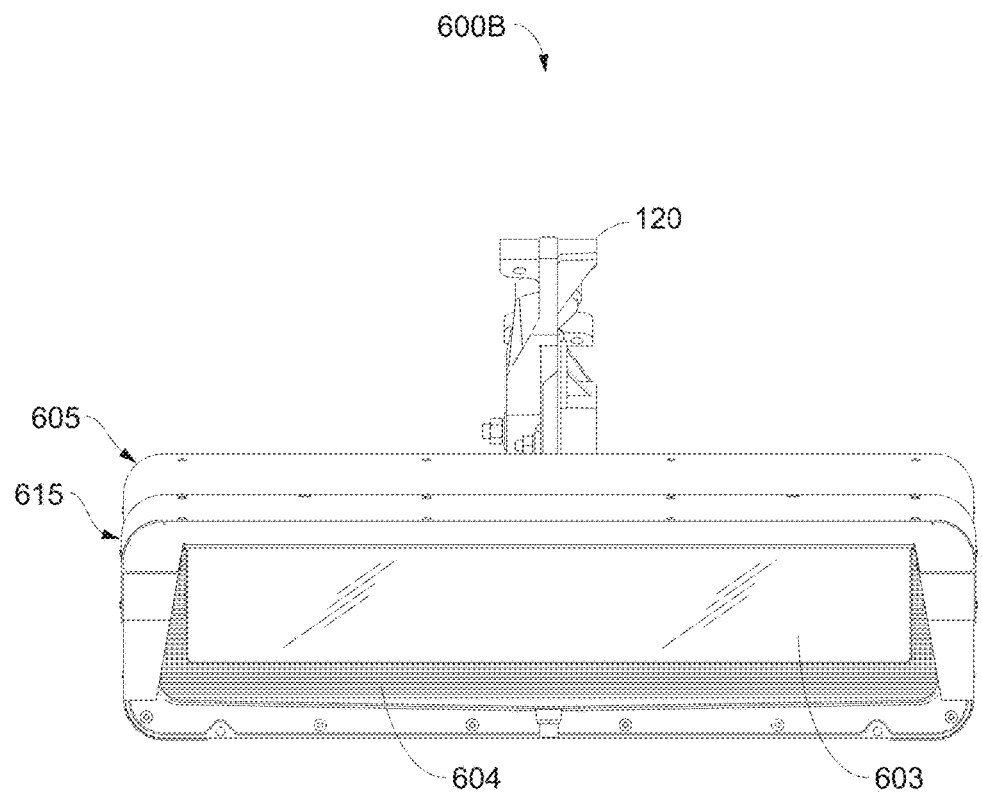
Figure 25:
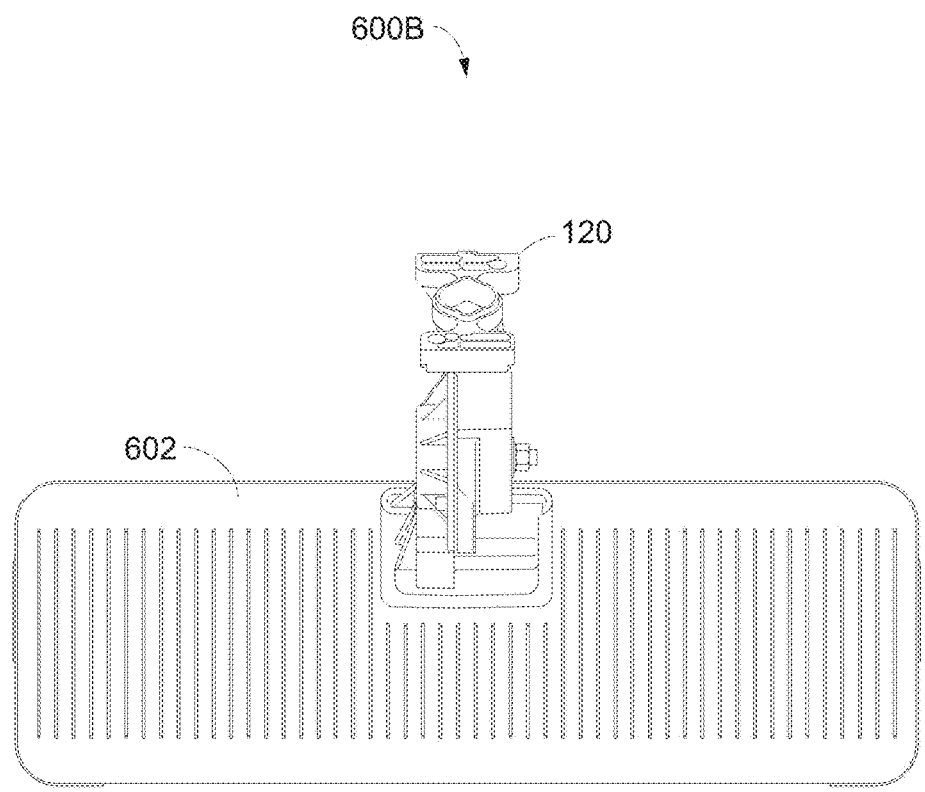
Figure 26:
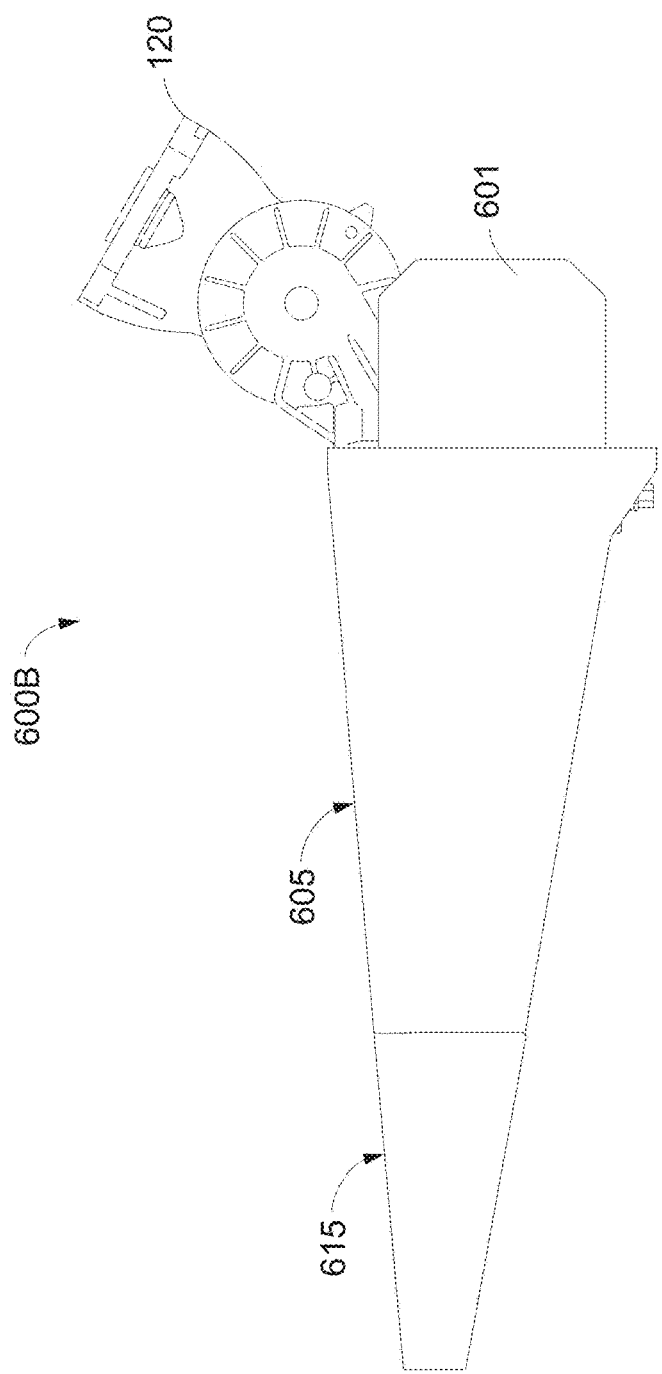
Figure 27:
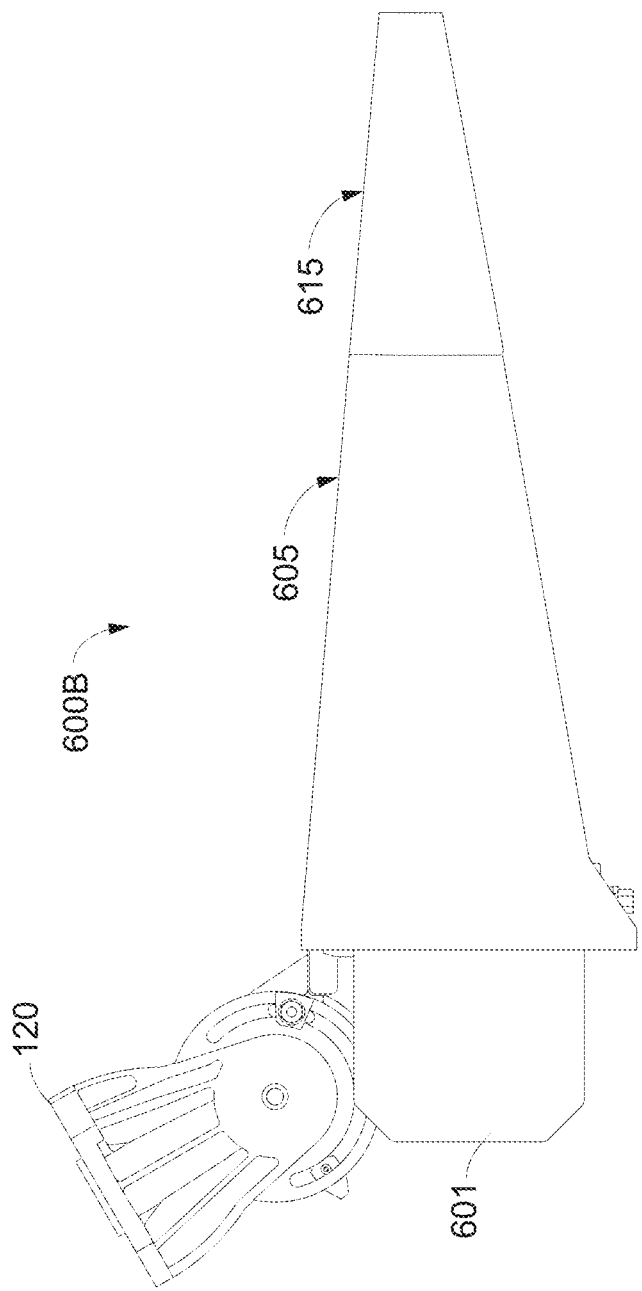
Figure 28:
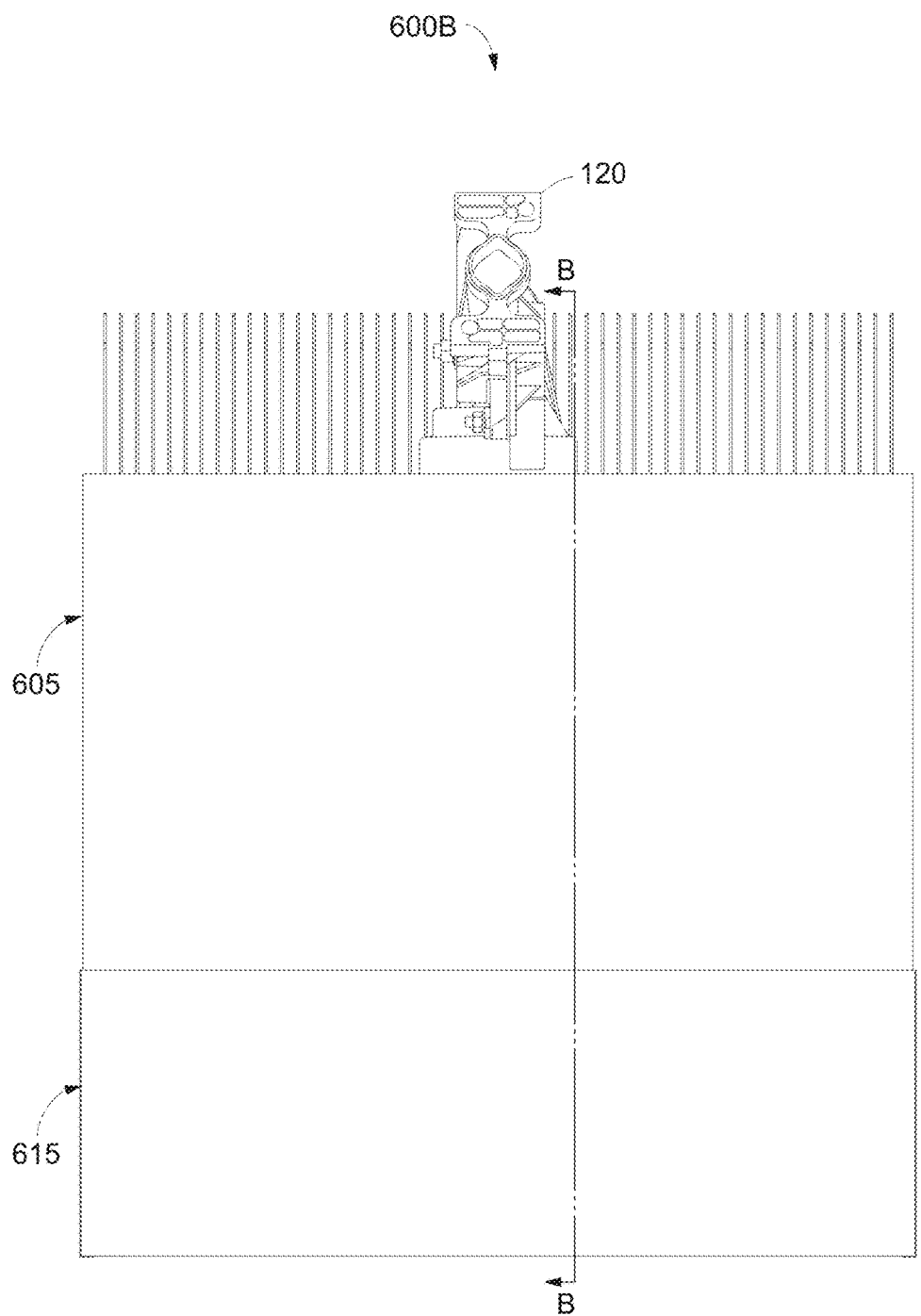
Figure 29:
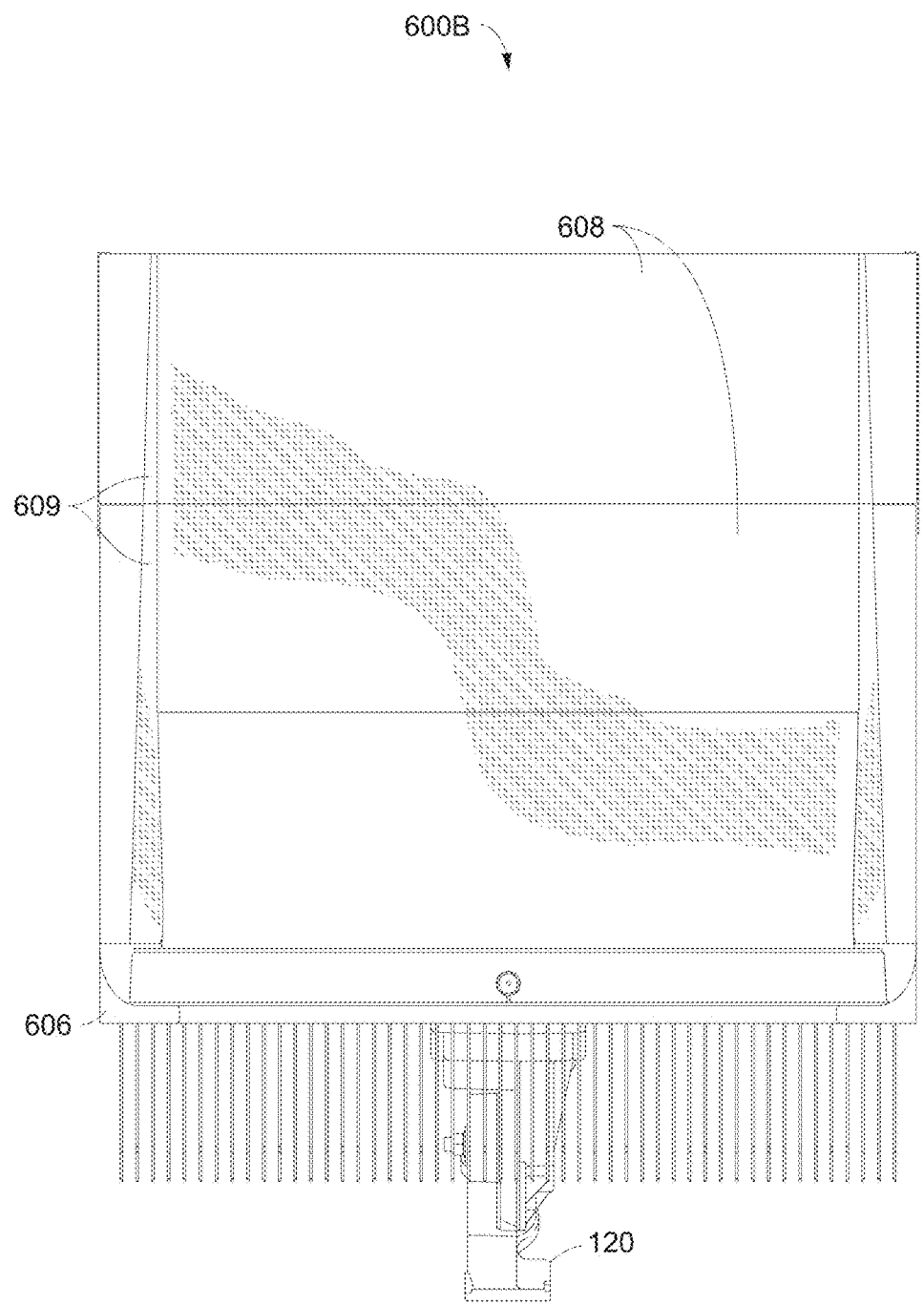

FIG. 23 illustrates a perspective view,

FIG. 24 illustrates a front view,

FIG. 25 illustrates a back view,

FIG. 26 illustrates a right side view,

FIG. 27 illustrates a left side view,

FIG. 28 illustrates a top view,

FIG. 29 illustrates a bottom view, and

Figure 30:
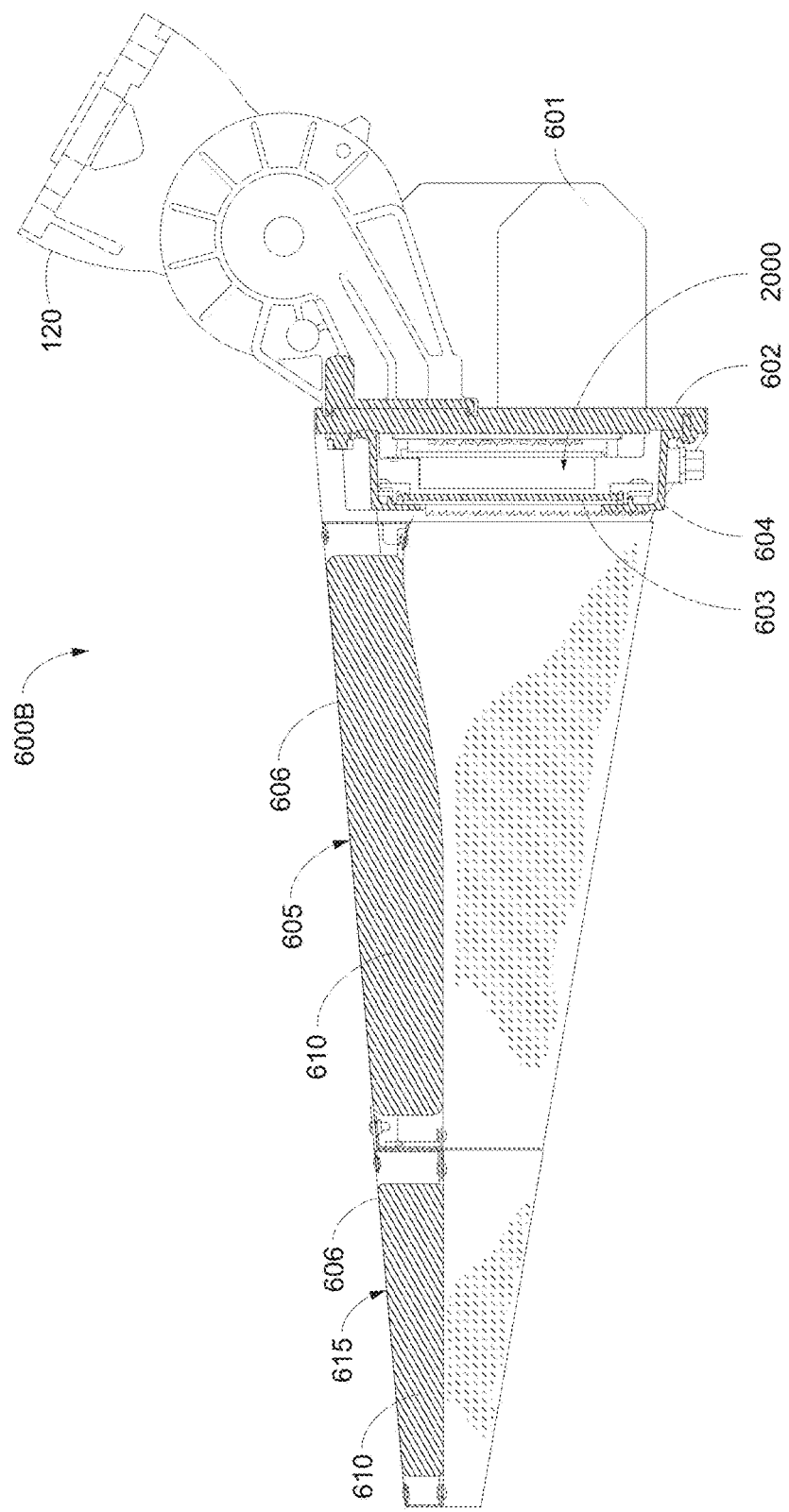

FIG. 30 illustrates an enlarged section view taken along line B-B of FIG. 28; note that for clarity fastening devices are only illustrated in FIG. 30.

Figure 31:
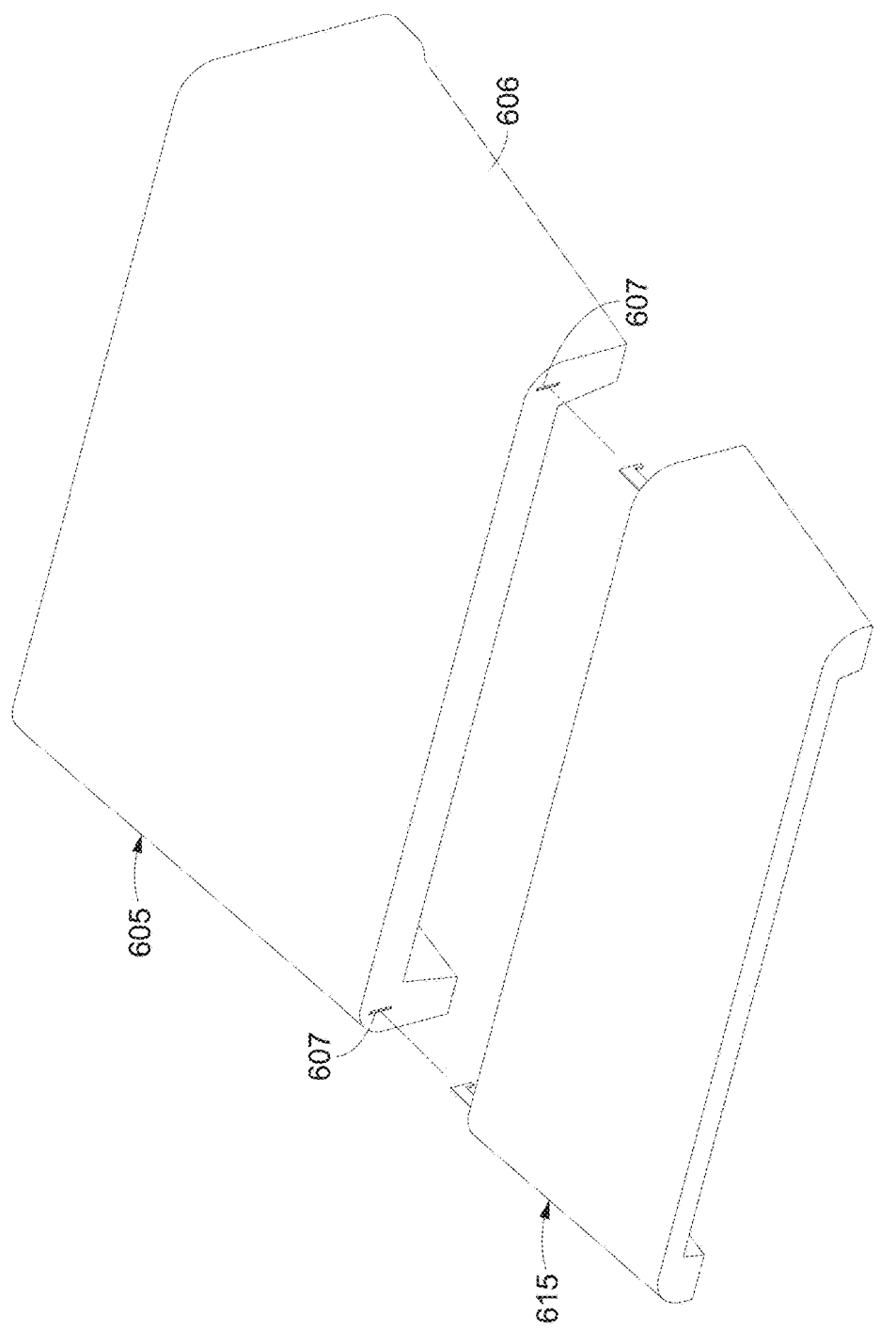

FIG. 31 illustrates one possible means of connecting visor portions so to produce a modular or otherwise customizable retrofit fixture according to aspects of the present invention.

FIGS. 32-39 illustrate various views of a third embodiment of LED retrofit luminaire according to aspects of the present invention.

Figure 32:
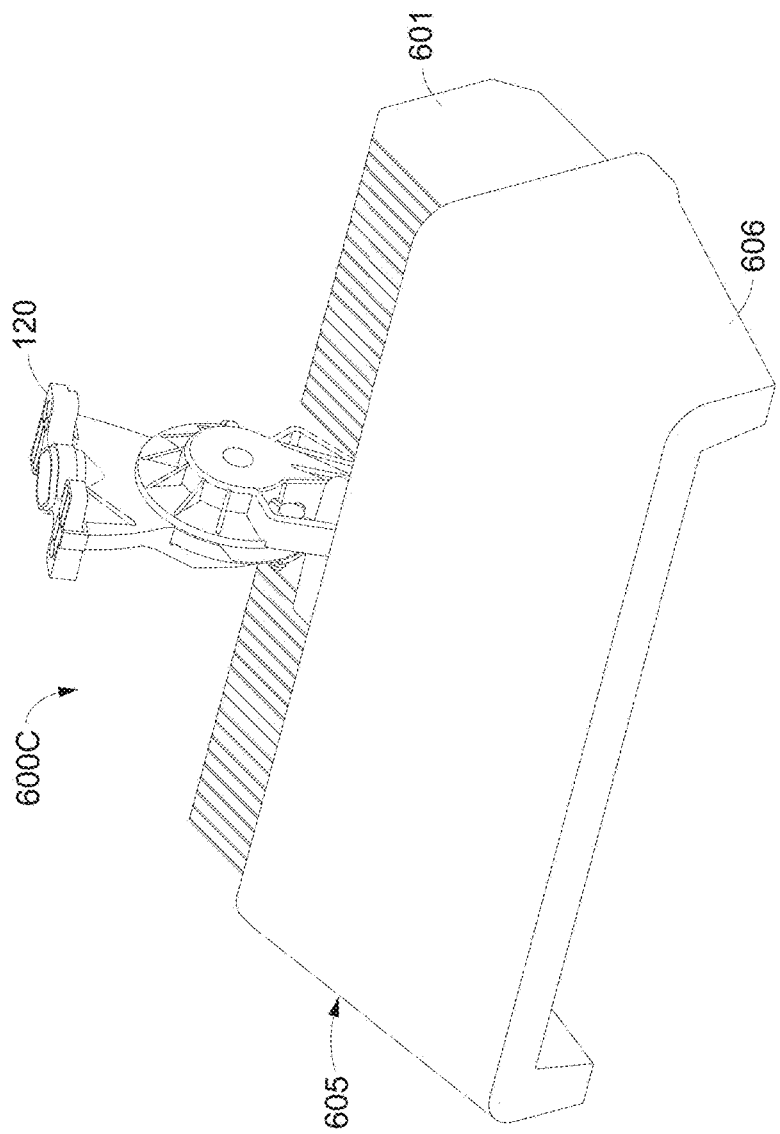
Figure 33:
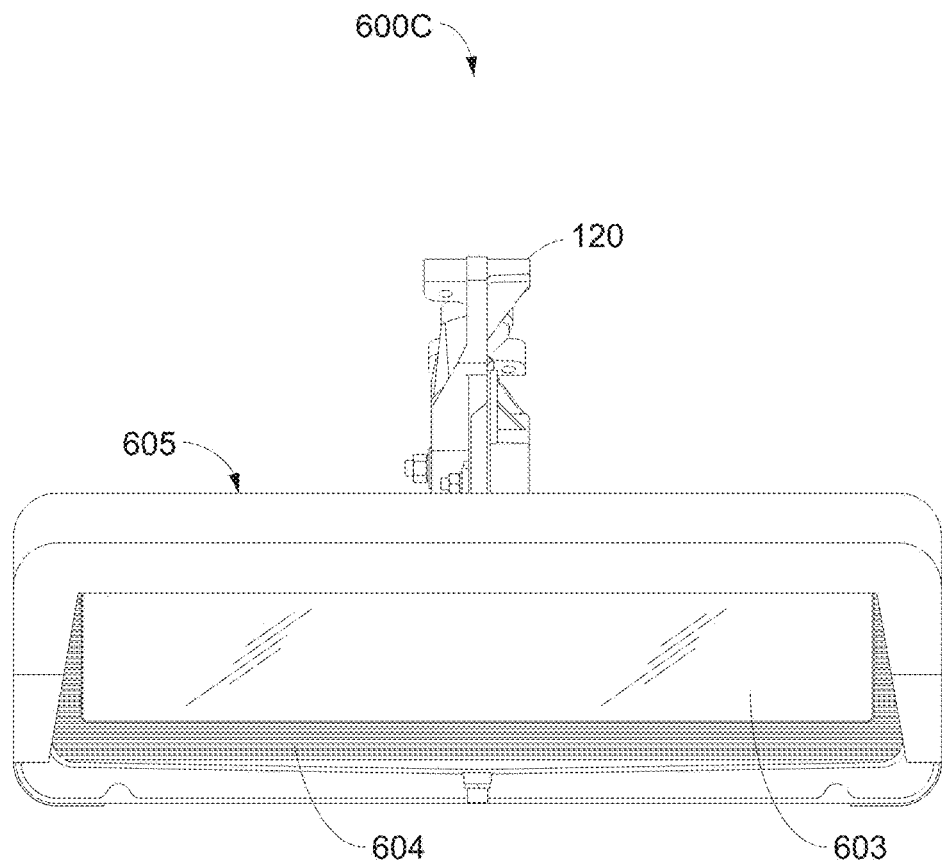
Figure 34:
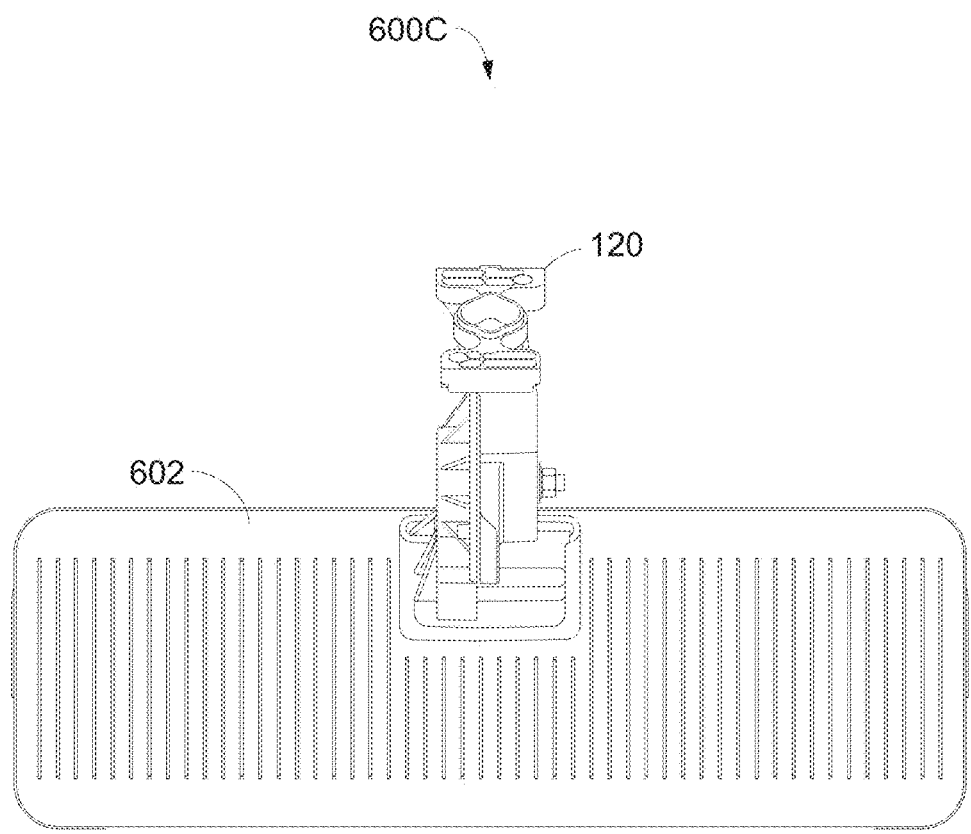
Figure 35:
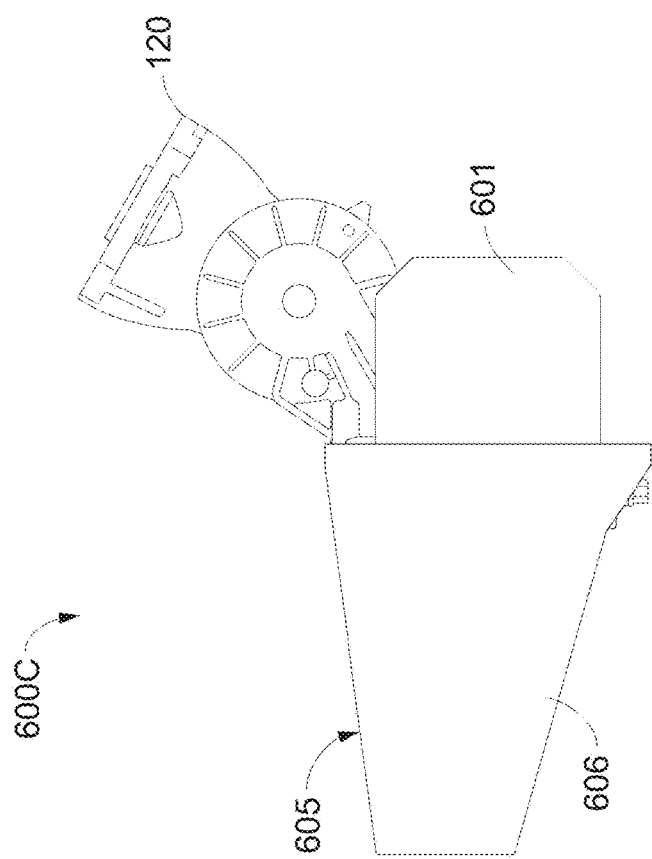
Figure 36:
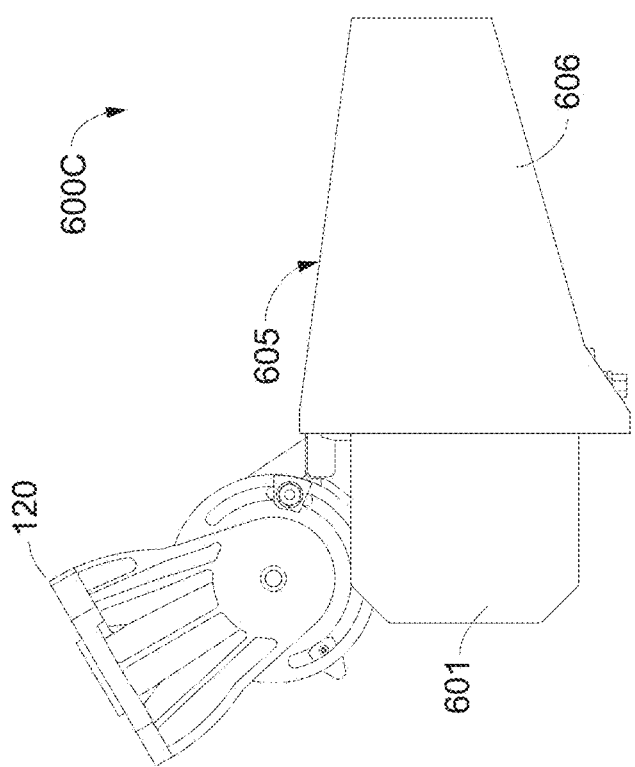
Figure 37:
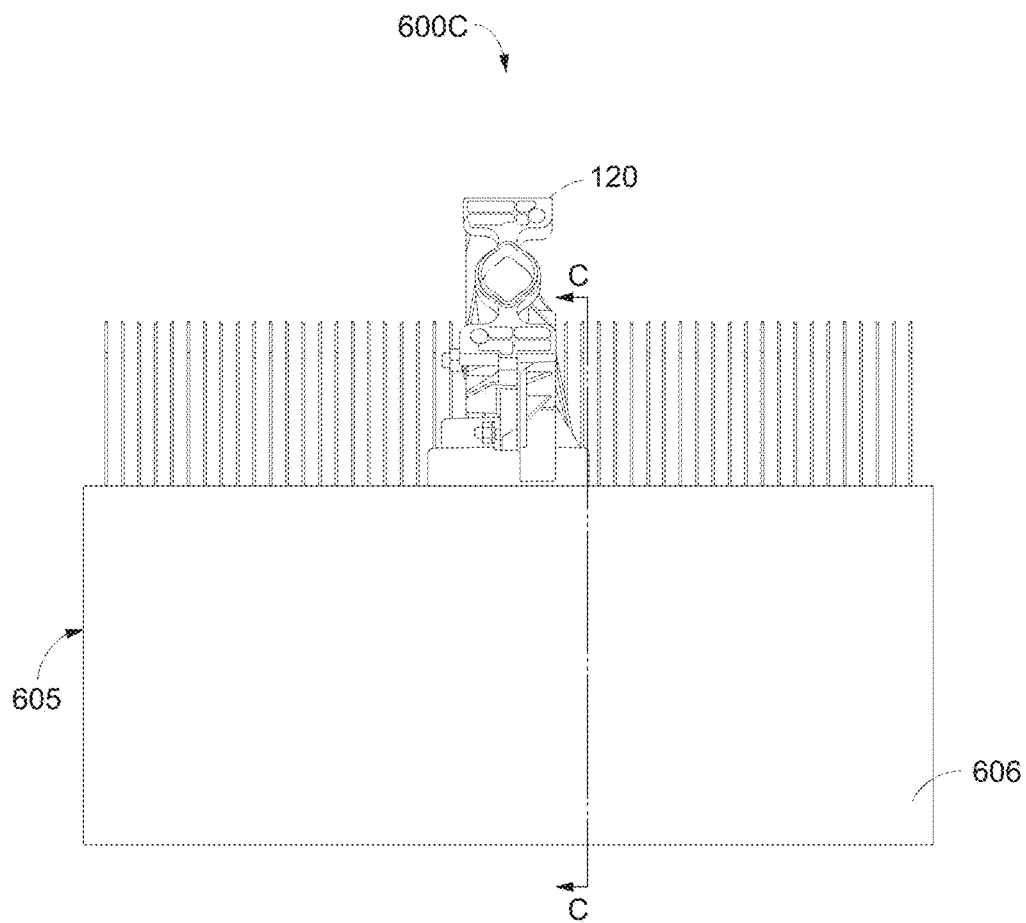
Figure 38:
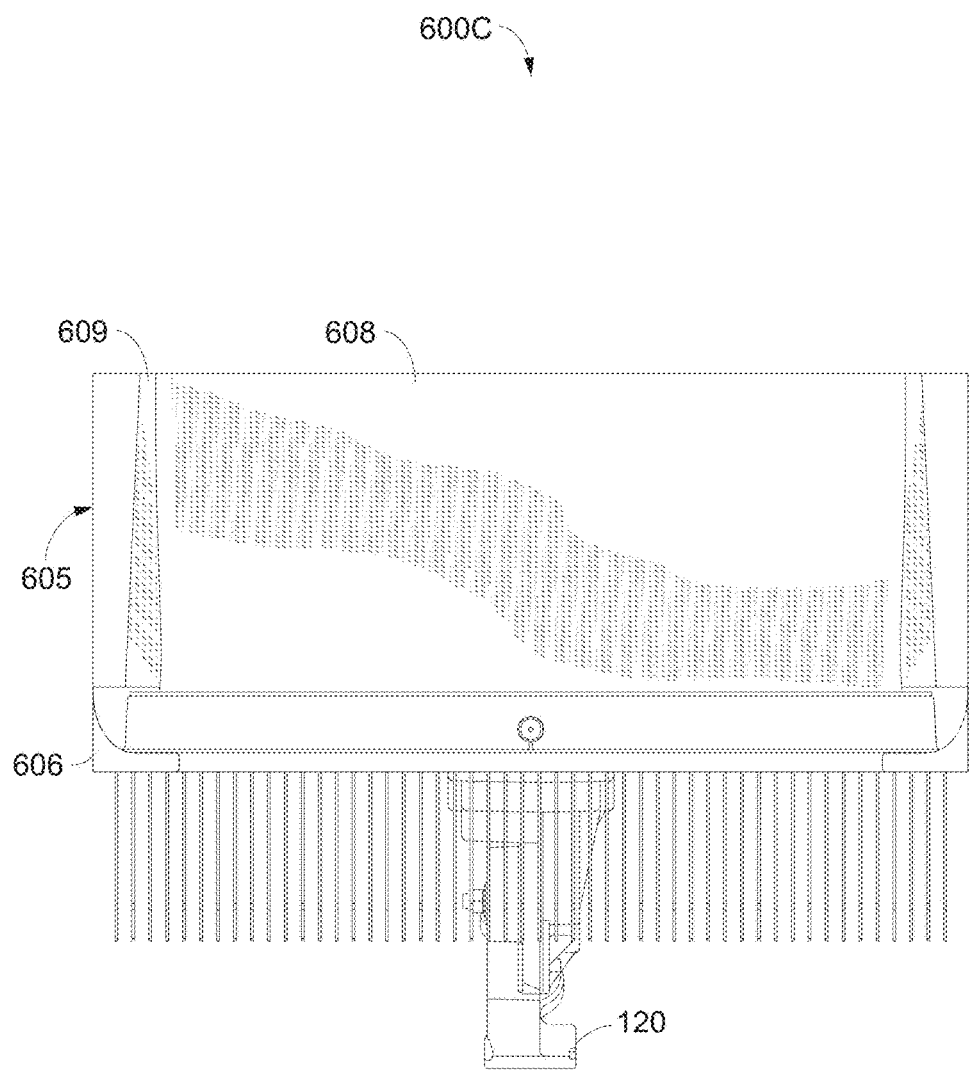

FIG. 32 illustrates a perspective view,

FIG. 33 illustrates a front view,

FIG. 34 illustrates a back view,

FIG. 35 illustrates a right side view,

FIG. 36 illustrates a left side view,

FIG. 37 illustrates a top view,

FIG. 38 illustrates a bottom view, and

Figure 39:
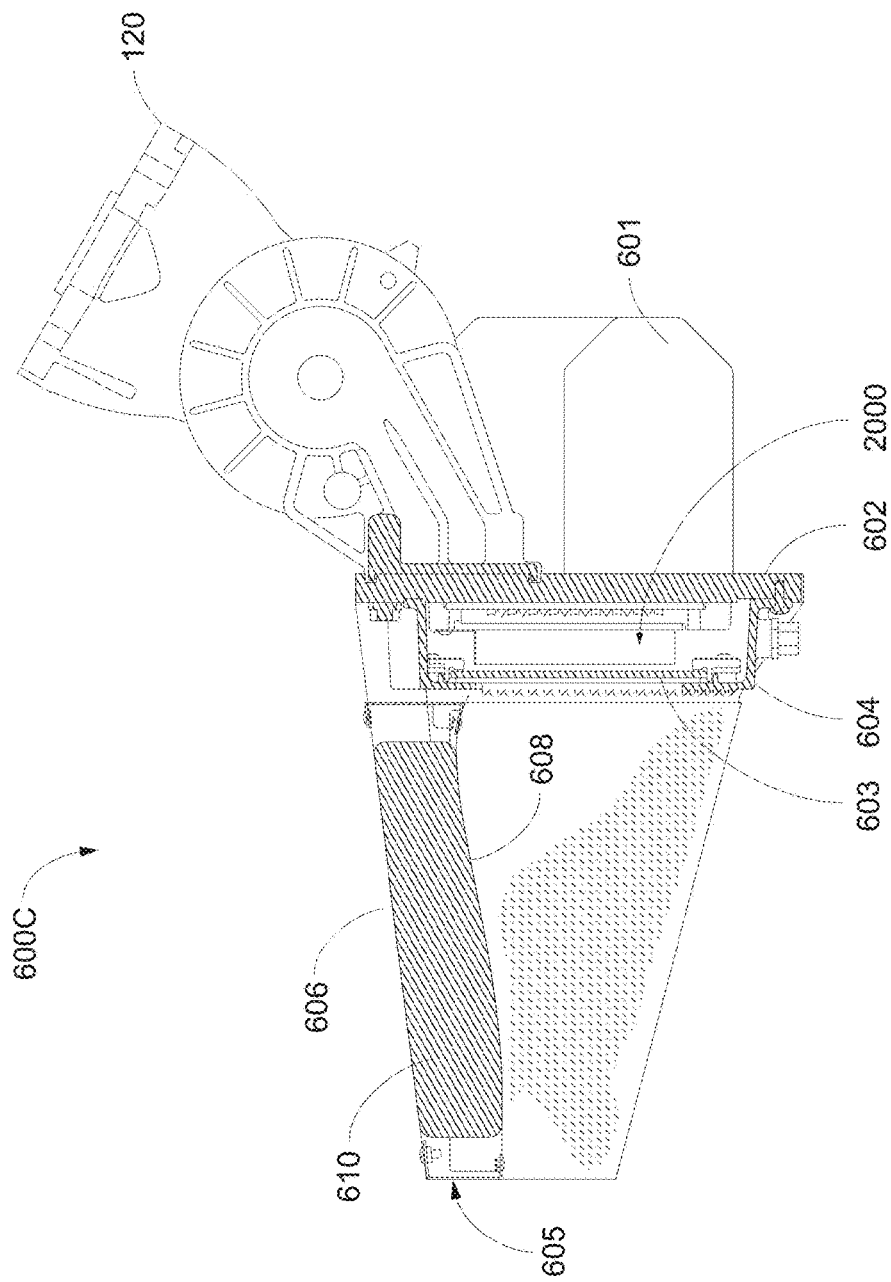

FIG. 39 illustrates an enlarged section view taken along line C-C of FIG. 37; note that for clarity fastening devices are only illustrated in FIG. 39.

Figure 40:
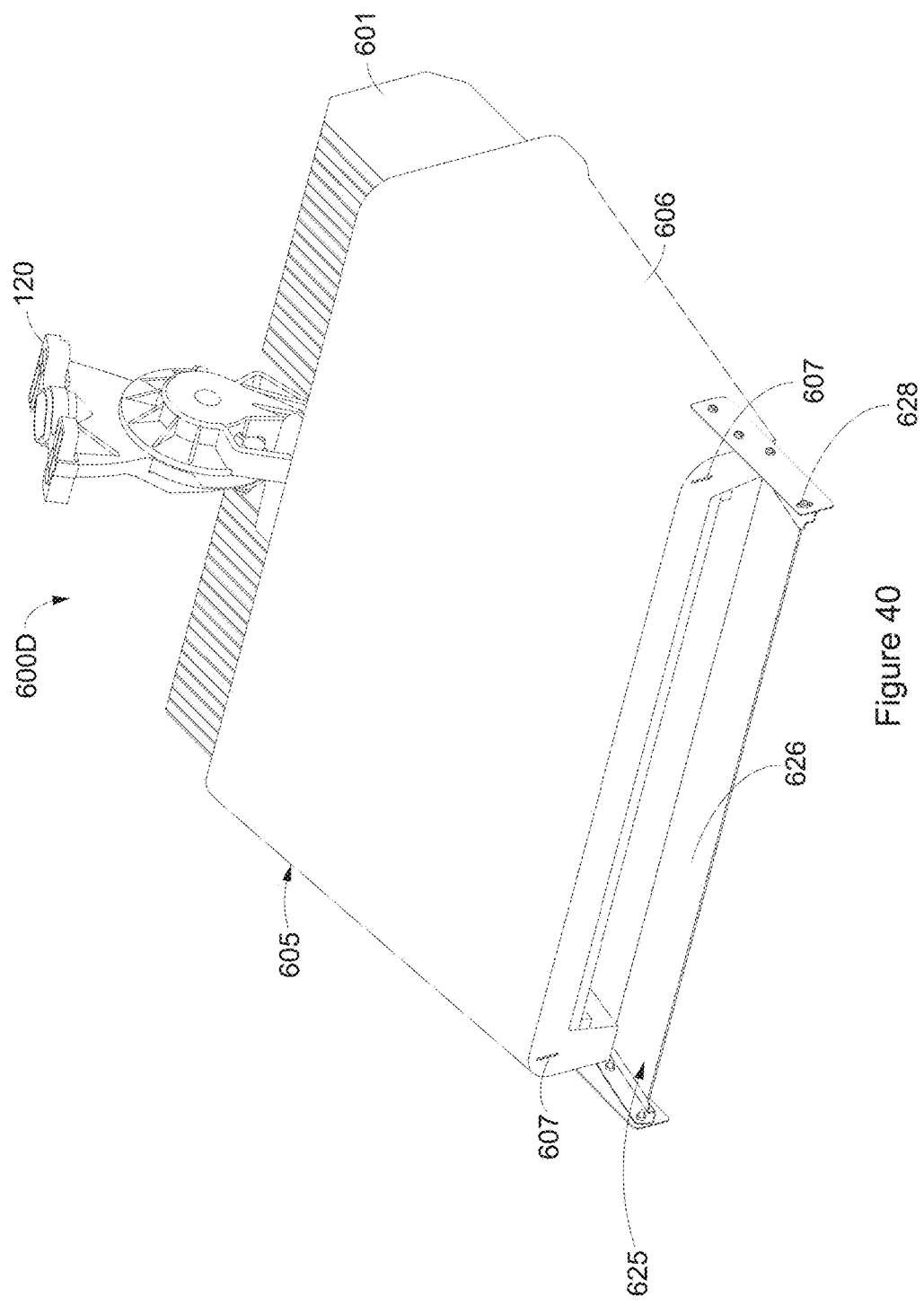
Figure 41:
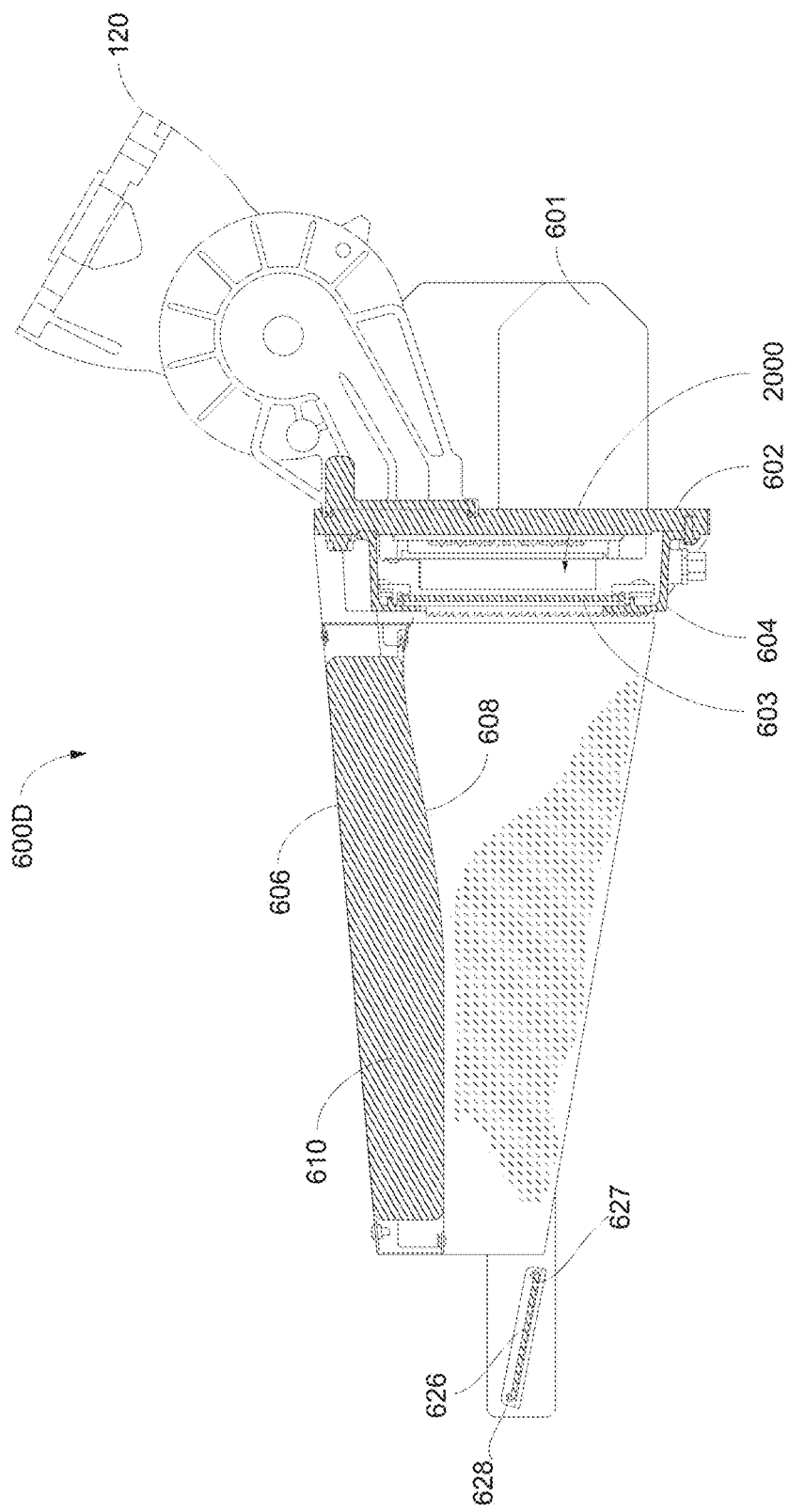

FIGS. 40 and 41 illustrate one possible option and alternative according to aspects of the present invention; here, to provide uplight.

FIG. 40 illustrates a perspective view and

FIG. 41 illustrates an enlarged section view taken along a line similar to that of lines A-A and B-B; note that for clarity fastening devices are only illustrated in FIG. 41.

FIGS. 42-45 illustrate another possible option and alternative according to aspects of the present invention; here, a method for increasing LED count while restricting horizontal beam spread so to produce more useful and lumen-dense lighting, and a second configuration of light directing and/or light redirecting devices in the internal and external spaces of the LED retrofit luminaire and associated with the LEDs.

Figure 42:
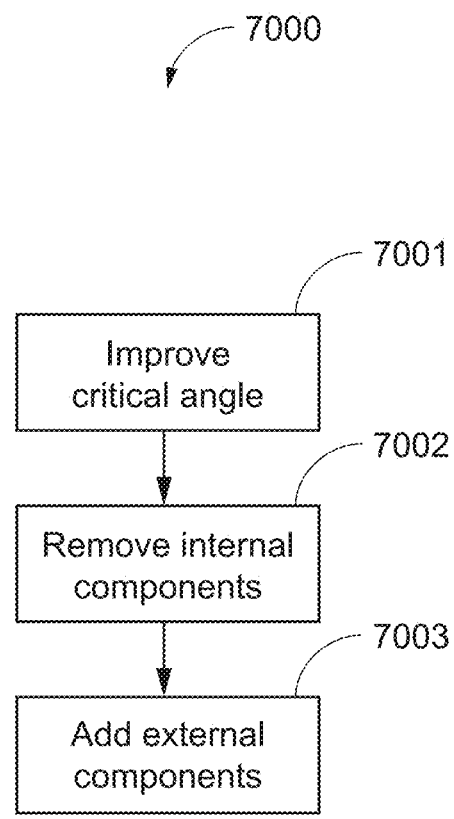
Figure 43:
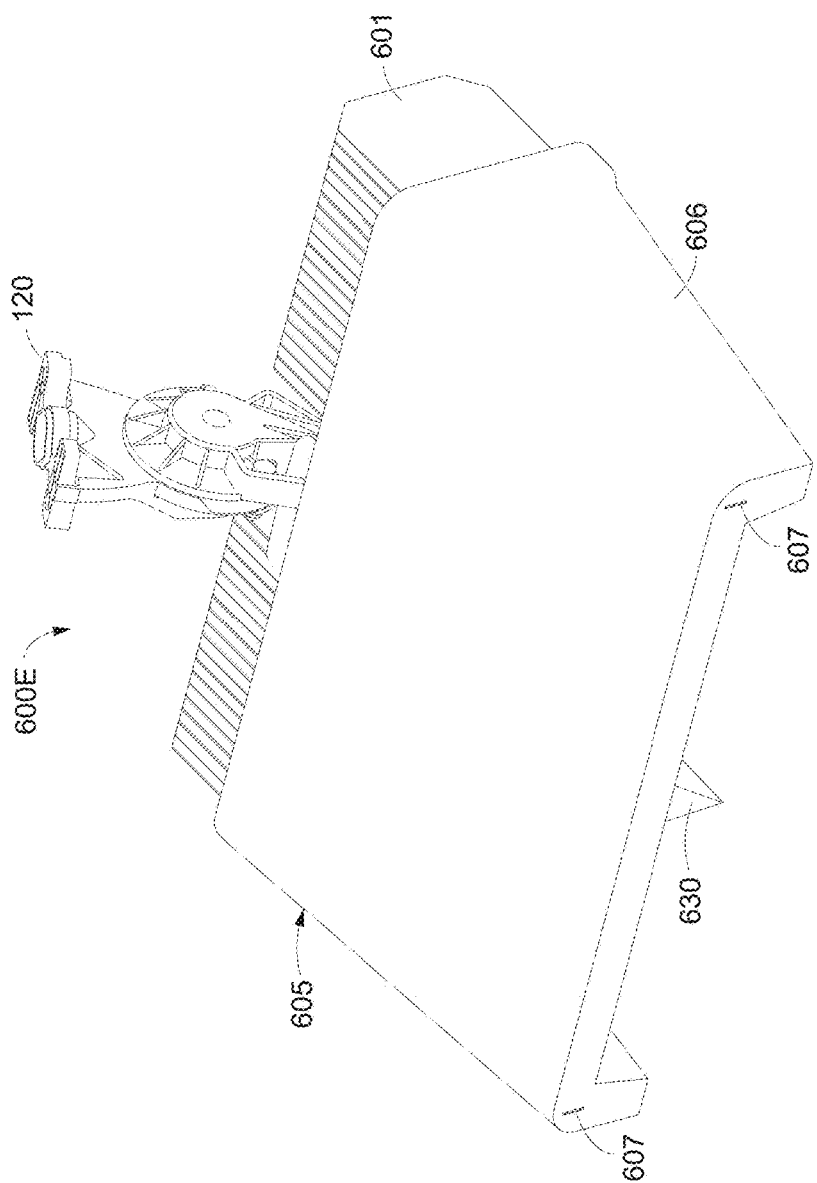
Figure 44:
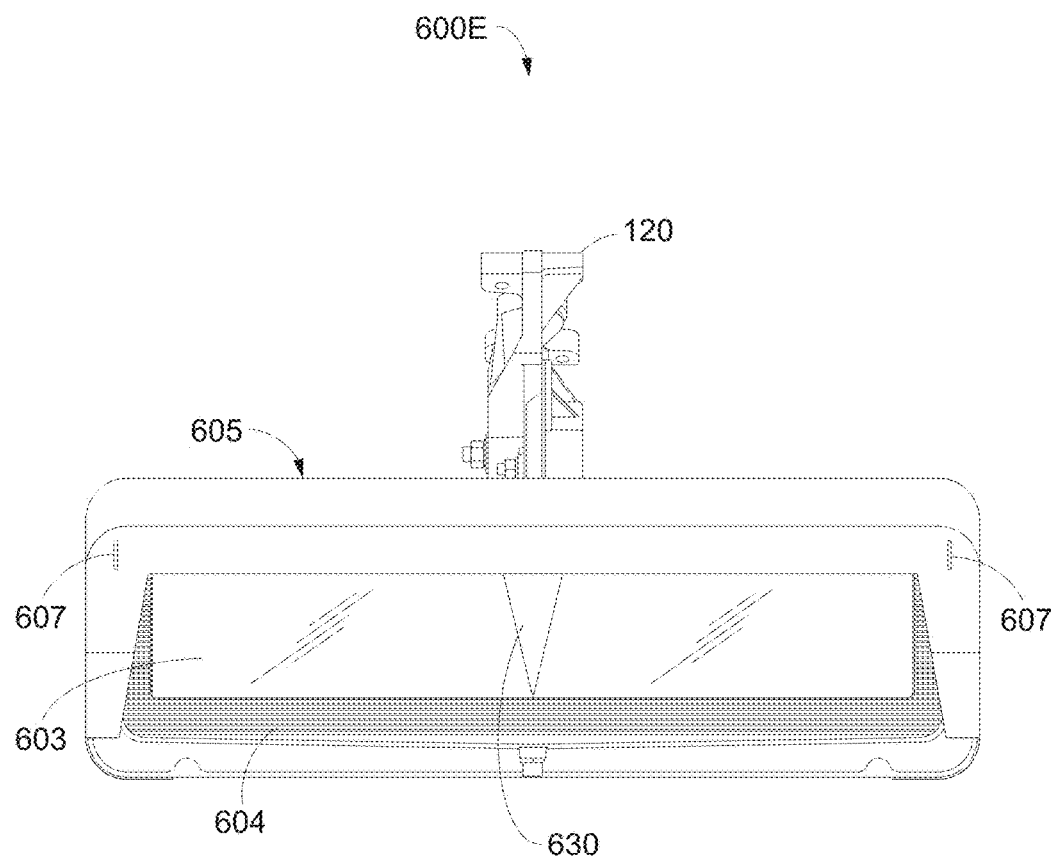
Figure 45:
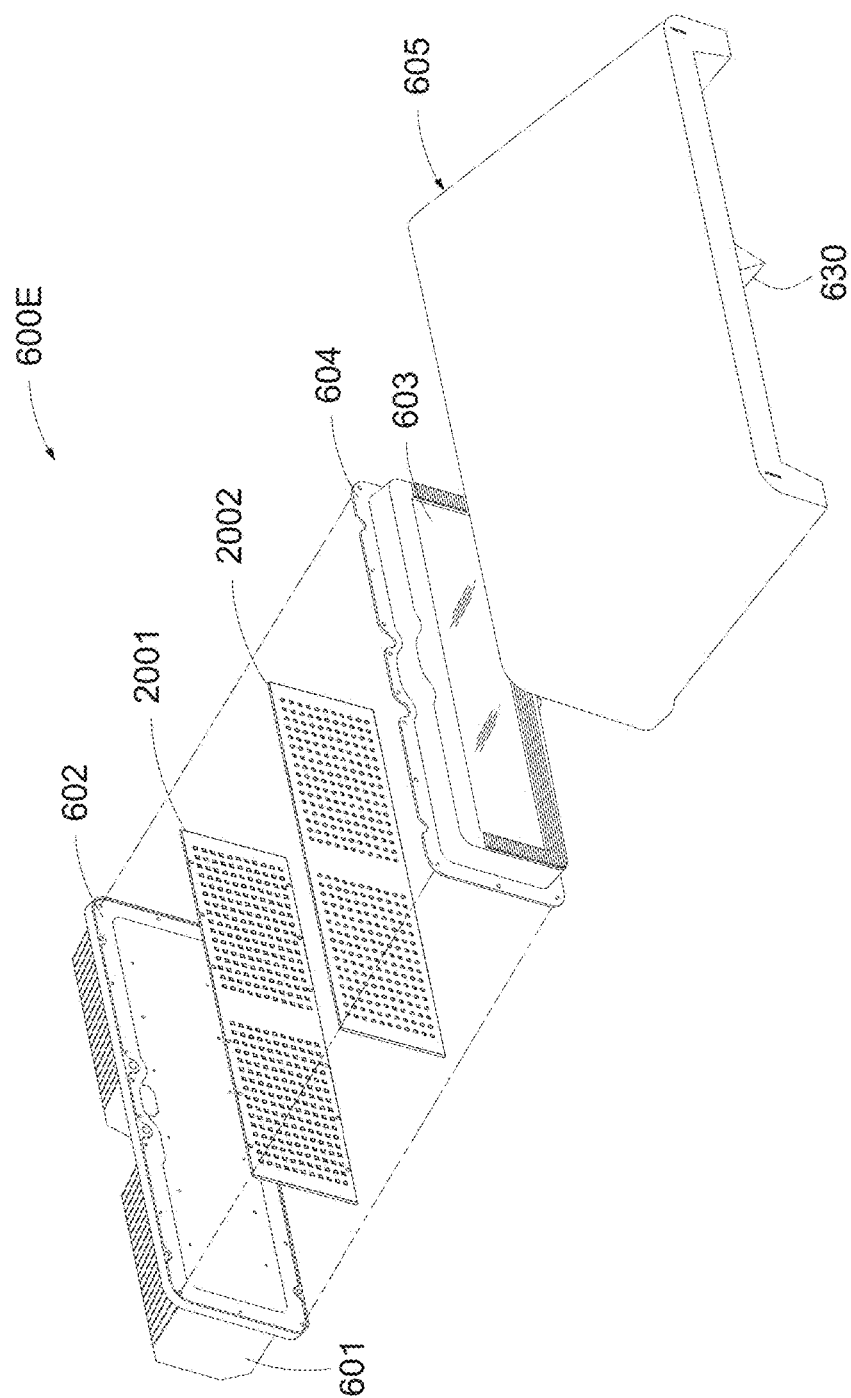

FIG. 42 illustrates said method,

FIG. 43 illustrates a perspective view of an LED retrofit lighting fixture designed to produce said useful and lumen-dense lighting, FIG. 44 illustrates a front view of the LED retrofit lighting fixture of FIG. 42, and FIG. 45 illustrates a slightly reduced in scale exploded perspective view illustrating said second configuration of light directing and/or light redirecting devices in the internal and external spaces of the LED retrofit luminaire; note that for clarity all fastening devices and electrical connections have been omitted.

Figure 46:
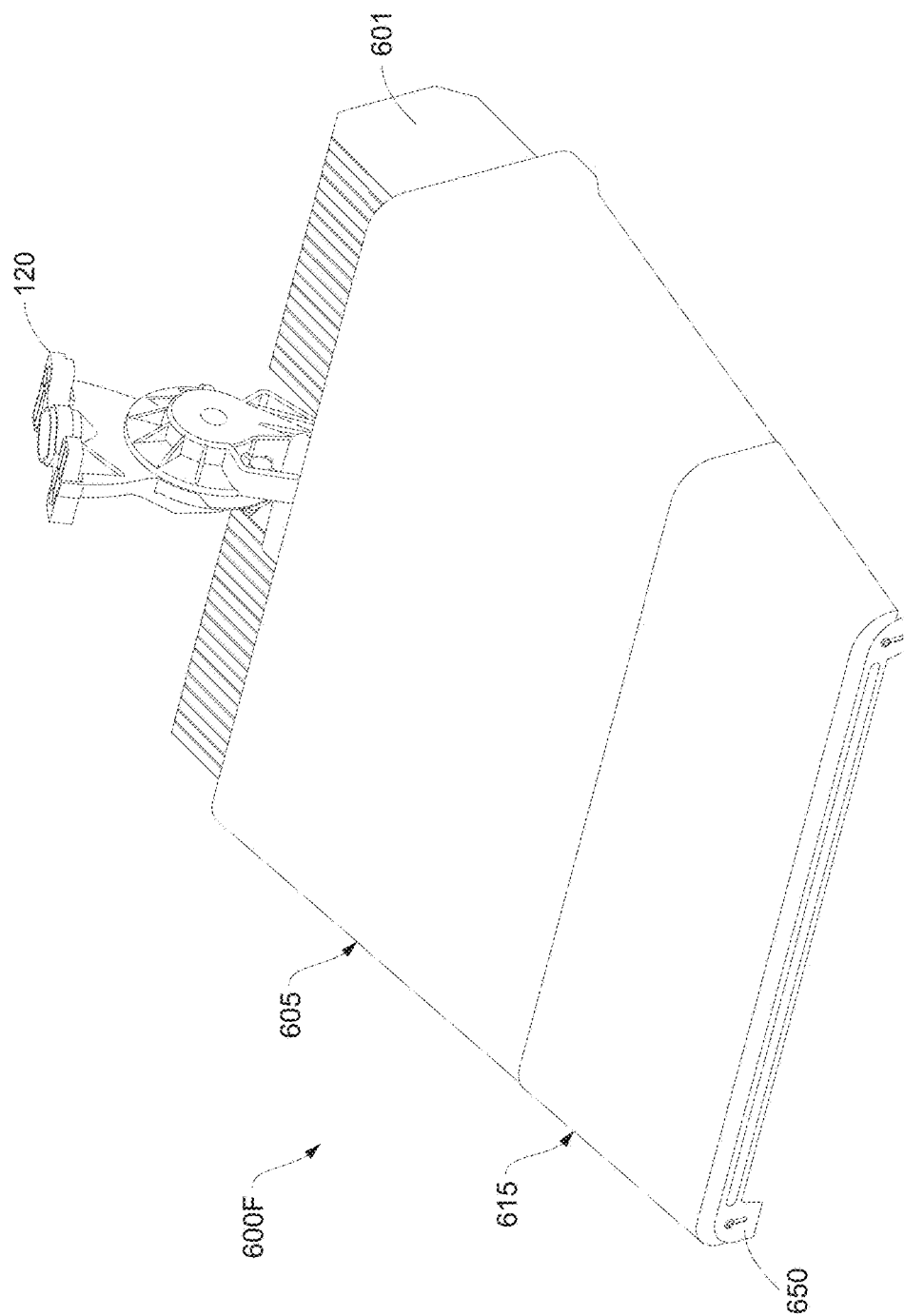
Figure 47:
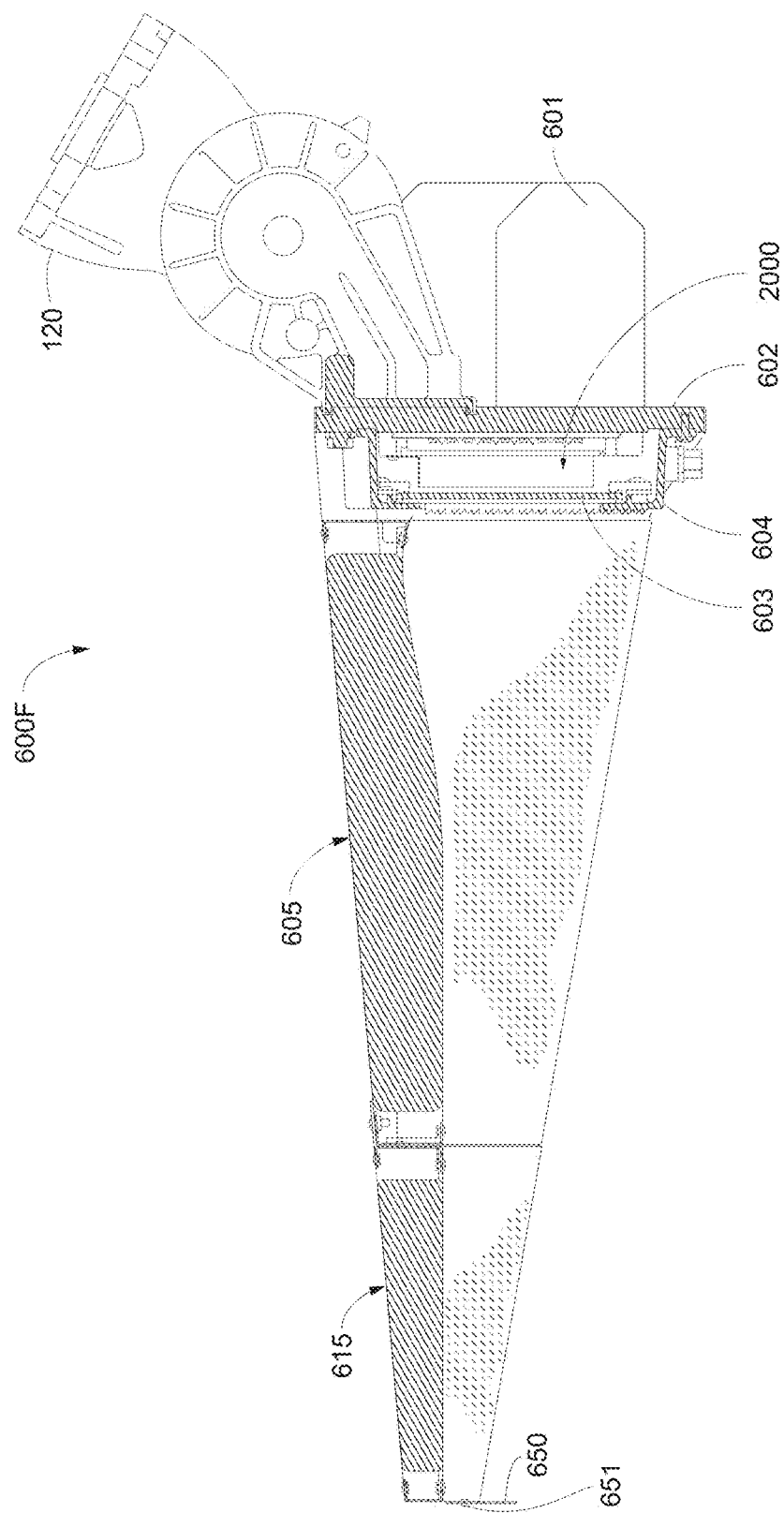

FIGS. 46 and 47 illustrate another possible option and alternative according to aspects of the present invention; here, an LED retrofit luminaire including means for extreme cutoff and glare control, as well as field adjustment.

FIG. 46 illustrates a perspective view and

FIG. 47 illustrates an enlarged section view of the LED retrofit luminaire of FIG. 46 taken along a line similar to that of lines A-A and B-B; note that for clarity only some fastening devices are illustrated in FIG. 47.

V. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same or similar parts throughout the drawings.

Regarding terminology, a number of terms have been used for reasons of convenience or explanation, and should not be considered limiting beyond that which is presented herein. For example, the terms "luminaire(s)" and "fixture(s)" are used interchangeably herein, as they often are in the lighting industry. Neither term is intended to purport any specific limitations beyond those which are described herein. As another example, reference is given herein to "ballast(s)" and "driver(s)"; while both are power regulating means for lighting technology, the former is used herein with respect to HID light sources and the latter is used with respect to LED light sources. However, it should be noted that were aspects of the invention applied to other kinds of light source (e.g., laser diodes), the corresponding terminology for the power regulating means may differ. It should be generally understood that the invention is, at its core, directed to lighting system retrofits and so any specific reference to a type of light source or power regulating means should be given its broadest interpretation; for example, a ballast could encompass magnetic ballasts, electronic ballasts, and generally any AC power conditioning means, whereas a driver could encompass generic drivers (i.e., simple DC power conditioning means), so-called smart drivers (i.e., complex DC power conditioning means that may include programmable features, self-healing components, active feedback loops, etc.), or something in between. All of the aforementioned possibilities are contemplated according to aspects of the present invention. Lastly regarding terminology, reference may be given herein to terms such as "ray(s)", "beam(s)", "beam pattern(s)", "beam shape(s)", "composite beam(s)", "beam design(s)", or the like; all of these terms make reference to light projected from a lighting fixture. It is to be understood that the nature of light is complex and that the terms herein may generally describe the shape of light as projected onto a target area from a lighting fixture, or the intensity in an aerial space above a target area, or the general direction of light as it leaves a luminaire, or the like. While specific descriptions and illustrations are provided herein, it is to be understood that none of these terms, descriptions, or illustrations are to be considered all-encompassing of lighting concerns one may encounter during a retrofit situation; however, it should also be noted that all are commonly known terms and understood well in the art of lighting.

B. General Method and Apparatus

As stated, the present invention is directed to lighting system retrofits; more specifically, retrofits for specialized lighting systems (which do not yet have a standardized or market-embraced approach). One such specialized lighting system is illustrated in FIGS. 1-4; here, a sports lighting system designed to illuminate a sports field 100 and some portion of the aerial space above the field. As can be seen from FIG. 1, site power is delivered via a transformer 20 or other device; delivery of said power to HID fixtures 300 along power lines 70 is regulated and/or controlled at multiple points in the circuit (here, at a pole cabinet 50 on pole 60, at a control cabinet 40, and at a distribution cabinet 30). If desired, additional control can be facilitated from an offsite control center 10 (e.g., via wireless communications to an antenna and control module located in control cabinet 40) such as is described in U.S. Pat. No. 7,209,958 hereby incorporated by reference in its entirety, or otherwise. Most sports lighting systems operate on three-phase power and require dedicated grounding 80, though as has been discussed, this varies widely from site to site. Power wiring is typically isolated from ground wiring (at least a portion of which may be integral to base 90) and, to the extent possible, internally routed to prevent theft and exposure to environmental effects; see, for example, FIGS. 2A-C in which wiring 70 is internally routed through pole 60, into crossarm 110, through adjustable armature 120, and to each HID fixture 300 in array 3000. This is adequate description of a specialized lighting system which may be retrofitted according to and benefit from aspects according to the present invention, though additional background information is available in U.S. Pat. Nos. 6,250,596, 7,600,901, 8,163,993, 8,337,058, and 8,770,796 all of which are hereby incorporated by reference in their entirety.

As has been discussed, a retrofit situation occurs when the light source being replaced is somehow different from the light source replacing it; most typically in terms of power requirements. In the context of retrofitting the sports lighting system of FIGS. 1-4 from HID to LED, this translates to some sort of change to power regulating means at pole cabinet 50. While power is distributed at cabinet 30 and controlled (e.g., turned on and off in accordance with a preset schedule) at cabinet 40, power is ultimately conditioned and regulated for the particular load (i.e., one or more HID sources 300) at cabinet 50 via ballast 400 and capacitor bank 200, and therefore is a primary focus of aspects of the present invention; see FIGS. 3 and 4.

Figure 5A:
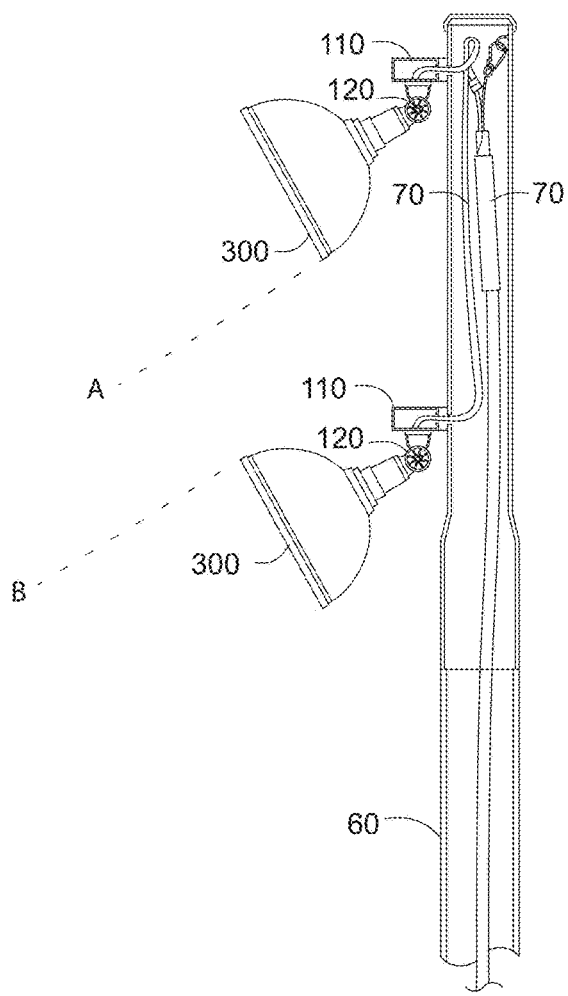
Figure 5B:
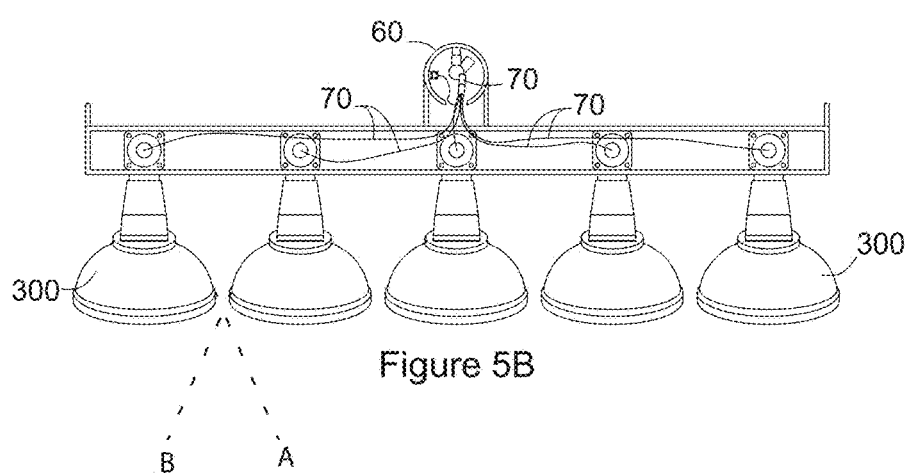

The other primary focus of the present invention is at the top of the pole; namely, at fixture level. Ideally, retrofit fixtures will fit in the existing crossarm footprint such that they may be pivoted left or right (sometimes referred to as panning) or pivoted up or down (sometimes referred to as tilting) without photometric or physical interference. Photometric interference occurs when light from one fixture (see light ray A in FIG. 5A) strikes another fixture in the system and causes onsite glare or other adverse lighting effects. This would occur, for example, if the topmost fixture 300 of FIG. 5A was pivoted downwardly such that light ray A struck the top of lowermost fixture 300 of FIG. 5A (i.e., the fixture associated with light ray B). Physical interference occurs when certain aiming angles are precluded because fixtures would strike each other or some other portion of the lighting system. This would occur, for example, if the leftmost fixture 300 of FIG. 5B (i.e., the fixture associated with light ray A) was pivoted sideways into the next fixture 300 (i.e., the fixture associated with light ray B). Both photometric and physical interference reduces useful light—namely, light that is useful for the particular application (here, the illumination of field 100 and the aerial space above field 100). It may be tempting to assume that photometric and physical interference in a retrofit system is simply a matter of poor aiming or lighting design, but it is important to note that if the retrofit fixture itself is not matched well to the application in terms of needed light levels, needed glare control, and existing pole location/weight loading limits, then extreme aiming is sometimes the only recourse to produce the needed lighting design. Other times, despite exceptional luminaire design, wiring is too degraded or crossarms are warped, or existing light levels grandfathered in are too low for a retrofit situation, and so the best recourse is retrofitting a full array of LED luminaires on a new crossarm with a new wiring harness—which has the added benefit of being tested for photometric and physical interference at the factory. All of this is addressed in the embodiments set forth.

Further, existing specialized lighting systems such as that just described which are retrofitted to include LED luminaires on a one-for-one basis—as is currently being done in the industry—often result in a significant loss of glare control (onsite and/or offsite). To combat the increase in glare, state-of-the-art LED retrofit fixtures are often capped, blackened, coupled with light blocking devices, etc.—which can be effective means of reducing glare—but also reduces overall light output, which necessitates more fixtures to get light levels comparable to the former HID lighting system. This can create an issue with respect to the weight the existing poles or crossarms can withstand, and the available space on the crossarm (as discussed for FIGS. 5A and B). It may be tempting to believe that LEDs are always a better choice than an older lighting technology—they do indeed have exceptionally long life when operated properly—but this can come at the cost of glare control (which is often not even understood to be an issue until a sub-par retrofit system is installed). This too is addressed in the embodiments set forth.

The exemplary embodiments envision apparatuses and methods for designing specialized LED retrofit lighting systems in a manner which resolves disparate power requirements, addresses needed lighting conditions, preserves most of the existing lighting system, and is more cost effective and customizable than that which is currently available in the art. These exemplary embodiments, utilizing aspects of the generalized examples already described, will now be described.

C. Exemplary Method and Apparatus Embodiment 1

FIG. 6 illustrates one possible method of designing an LED retrofit lighting system according to the present embodiment. As can be seen from method 6000, a first step 6001 comprises evaluating the existing lighting system; this includes evaluation of the 3D space in which the existing lighting system is situated, evaluation of lighting and non-lighting portions of the existing lighting system, and all portions (both useful and not useful) of light emitted from the existing lighting system—and how said portions interact with a target area (usually a 2D plane) within the 3D space, with the 3D space itself, and with the various portions of the existing lighting system. Step 6001 may be relatively straightforward, but it is more likely that for specialized lighting systems such as that illustrated in FIGS. 1-4 evaluation will be more complicated. For example, one must evaluate the 3D space itself—proximity to residences, observatories, or other locations that might oppose offsite glare or uncontrolled uplight. Perhaps the existing lighting system has such poor control of light that the site itself does not have auxiliary lighting for adjacent parking lots, walkways, etc. In this sense even though this portion of the overall projected light is uncontrolled and may not explicitly light the target area, it is useful and should be considered in the retrofit lighting design. Both lighting technology and non-lighting technology portions of the existing lighting system need to be evaluated according to step 6001. With respect to the latter, delivered site power, ballast rating, efficiency of existing parts, maximum allowed EPA and/or loading on existing poles, condition of wiring and/or connectors/harnesses (all of which are generally considered connection means), and full horizontal and vertical pivoting allowable using the existing crossarm footprint are all non-limiting examples of what may be evaluated with respect to the existing lighting system. With respect to the lighting technology, overall light levels, lighting uniformity, onsite and offsite glare levels, color temperature, type of sport played and level of play, and hours of usage are all non-limiting examples of what may be evaluated with respect to the existing lighting system. To achieve the aforementioned, it is likely one or more visits to the site in combination with measurements from known devices (e.g., light meter, ammeter) will be needed—this is in addition to reviewing data, ratings, etc. from the manufacturer of the existing equipment. And, of course, since retrofits often occur because there is some perceived benefit to doing so, it is generally beneficial to discuss with the user (e.g., owner, operator) what is liked or not liked about the existing lighting system. So it can be seen that step 6001 may include gathering both objective (e.g., horizontal footcandles at the field of play) and subjective (e.g., user perception of onsite glare) input.

Having input from step 6001, a lighting designer or other person may concurrently design a retrofit luminaire (step 6002a) and reconcile disparate power means (step 6002b). There is an inherent benefit to performing steps 6002a and 6002b concurrently as one informs the other. For example, evaluation of the existing lighting system (step 6001) may inform step 6002b insomuch that the available wattage for the load may be determined, but evaluation of the existing lighting system may also inform step 6002a insomuch that the available crossarm footprint (i.e., the vertical and horizontal space a fixture can occupy at its mounting position on the crossarm without physical or photometric interference) will determine the size of the LED retrofit fixture which indirectly determines operating current (which is dependent on number of LEDs per fixture and needed light level). This again informs step 6002b insomuch that a rectifier, capacitor bank, and other power regulating means can be devised to step up, step down, or condition the available wattage for the desired operating current (or other operating condition) of the load. Thus, it can be seen that there is a benefit in concurrently considering steps 6002a and 6002b.

Ultimately, steps 6002a and 6002b will likely include a number of substeps which may vary from retrofit to retrofit; two possible examples are discussed for the present embodiment. At the end of the design process, though, the retrofit lighting system is installed according to step 6003. As previously stated, there may be some situations where wiring is degraded or crossarms are warped or something in the existing lighting system prevents installing an LED retrofit lighting fixture in the existing crossarm footprint (i.e., the space the existing lighting fixture occupies relative the crossarm when taking into account typical vertical and horizontal aiming angles); such a situation is discussed in a subsequent embodiment. In the present embodiment it is assumed only the existing lighting technology is being removed from the existing lighting system, and is presently discussed.

Power Regulating Means and Wiring

Figure 7:
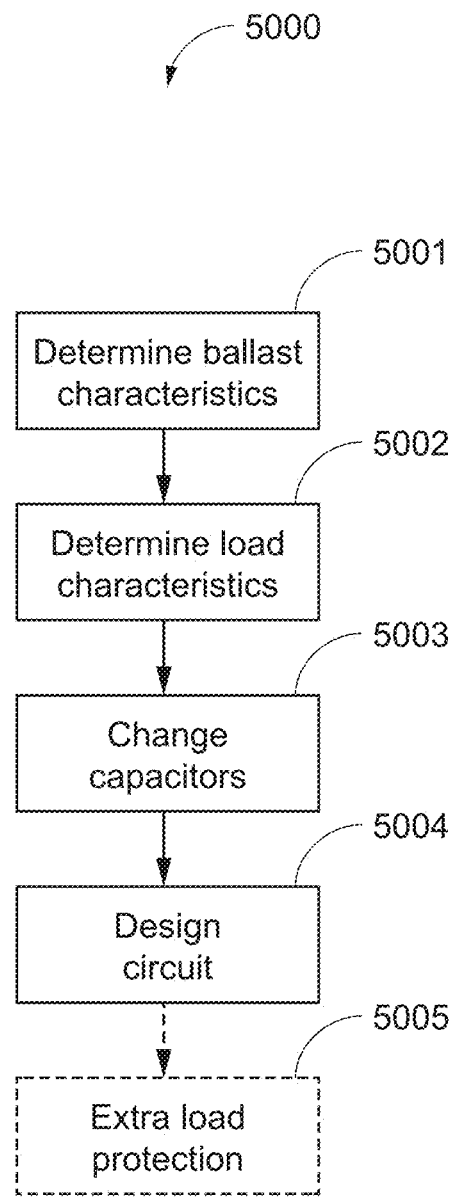
FIG. 7 illustrates one possible method of reconciling disparate power requirements according to the method of FIG. 6.

FIG. 7 illustrates one possible method of reconciling disparate power requirements between an LED retrofit luminaire and an existing HID luminaire for the lighting system of FIGS. 1-4, and may be included as substeps of step 6002b of FIG. 6. As can be seen from method 5000 a first step 5001 comprises determining ballast characteristics (e.g., noise, output power) which includes likewise determining characteristics of other power regulating means (e.g., capacitors). Most often AC ballast circuits for specialized HID lighting systems include a magnetic ballast coupled with one or more capacitors so to produce a constant wattage to the load; this was generally illustrated in FIGS. 3 and 4. Determining the output of the ballast-capacitor circuit according to step 5001 is needed because that output must be delivered to the new LED load, the characteristics of which are determining according to step 5002. Even if striving for a one-to-one fixture replacement, it is likely capacitors will need to be at least partially switched out according to step 5003; this may be due to a desired drive current for the new LED load (as LEDs are low current devices), or simply a desire for more or different capacitors to reduce flicker in the new LED load. This is in many ways beneficial because capacitors are often also near their end of life when older technology is being retrofitted, yet it is far more cost effective to switch out capacitors and add a rectifier circuit (step 5004) than to completely gut the enclosure and install a commercially available driver (assuming one is available at the needed power level, which they often are not for high power (e.g., greater than 600 W) lighting systems). It is estimated that the solution illustrated in FIGS. 8-10 would cost half as much (if not less) than installing a traditional driver (again, assuming a high power driver was available), even if optional load protection (step 5005) is included (e.g., extra surge protection for sensitive solid state components). Furthermore, in-house reliability data at moderate voltage levels puts the power regulating means of FIGS. 8-10 at a replacement rate of approximately 0.13% (as compared to commercially available drivers which had a replacement rate of approximately 0.85% for the time period tested)—so the solution in FIGS. 8-10 is, under the conditions tested, more reliable than a traditional LED driver. Of course, there is a compromise to be made; as will be seen from the electrical circuit of FIG. 10 functionality to provide dimming is absent. Also, depending on the number and capacitance of the new capacitors, flicker may be an issue; as designed according to the present embodiment flicker is on the order of 9% (which is below the threshold that can be perceived by the human eye and is not perceivable during broadcasts, but would be present during slow motion replays).

In practice, the lighting system of FIGS. 1—4 might be retrofitted to reconcile disparate power requirements in accordance with aforementioned FIGS. 8-10. Firstly, capacitor bank 200 is replaced with capacitor bank 500 the capacitance of which is determined in accordance with method 5000. For example, an HID ballast-capacitor circuit producing a constant wattage on the order of 1500 W at a capacitance of 32 µF might be replaced with a capacitor bank 500 having a capacitance on the order of 28 µF so to produce a constant wattage on the order of 900 W—which is an adequate wattage to operate the 224 XM-L LEDs (available from Cree, Inc., Durham, N.C., USA) wired in two parallel strings of 112 within LED retrofit fixture 600A so to provide comparable light levels to the older lighting technology (here, a 1500 W HID lamp) without (i) increasing wiring in the pole and (ii) with imperceivable flicker under most conditions. The switching of capacitors is a straightforward process and well known in the art—see U.S. Pat. No. 7,848,079 hereby incorporated by reference in its entirety—but modifying the output from the ballast to condition it for the power requirements of a DC load is another matter.

For the system of FIGS. 1-4, ballast output must either be stepped down (e.g., adding taps, removing windings, etc. as is common in the art) or stepped up (as the case may be), a current limiting circuit must be introduced, or something else must be modified. U.S. Provisional Patent Application Ser. No. 62/522,345 to which the instant application claims priority, details all the deficiencies in these approaches. Instead, a rectifier control circuit 1000 (FIGS. 9 and 10) is introduced into the overall circuit so to condition power downstream of the ballast and new capacitors for the LED load 600. In practice, rectifier control circuit 1000 may comprise a rectifying sub-circuit 1001, an inrush current limiting sub-circuit 1002, and an output conditioning sub-circuit 1003. Constant wattage AC power from ballast 400 and new capacitor bank 500 enters circuit 1000 at junction J1. Power is rectified at diode bridge D1-D4 to produce DC power. The DC power signal is smoothed out by capacitor bank 1003 whereas a combination of FETs, transistor, resistors, voltage regulator, and capacitors which make up sub-circuit 1002 serve to limit inrush current to capacitor bank 1003 (which reduces ripple, which in turn reduces the flicker effect that plagues many LED lighting systems) upon startup. Dissipating resistor R3 dissipates the charge from capacitor bank 1003 when power is removed from the system.

Ultimately, what leaves junction J2 is appropriately stepped down (from the ballast), rectified, conditioned power suitable for the new load (LED retrofit fixture 600). If desired, extra protection or diagnostic features could be added to rectifier control circuit 1000 according to step 5005 of FIG. 7; for example, via fuses (which not only protect the system but help to indicate the source of an issue) and surge protection devices for protection against FET switching transients (line transients are already adequately filtered by the ballast and capacitors upstream of circuit 1000) such as are illustrated in aforementioned U.S. Provisional Patent Application Ser. No. 62/522,345.

As stated, according to the present embodiment retrofitting power regulating means does not require substantial rewiring of the existing lighting system. Rather, the board of circuit 1000 can simply be placed in enclosure 50 (FIG. 8)—as it is only on the order of 10"×3"—and wired into the existing system using quick-type connectors (e.g., any of the universal MATE-N-LOK® brand connectors available from TE Connectivity Ltd., Berwyn, Pa., USA) at points X1-X4; this is included in step 6003 of method 6000 (FIG. 6).

LED Retrofit Luminaire

FIG. 11 illustrates one possible method of designing an LED retrofit luminaire for the lighting system of FIGS. 1-4, and may be included as substeps of step 6002a of FIG. 6. As can be seen from method 4000 a first step 4001 comprises evaluating the current lighting system from a design standpoint. Step 4001 generally includes evaluating how much light is needed (e.g., light levels, lighting uniformity), where it is needed (e.g., how high in the air uplight is needed, how much of each individual beam needs to be overlapped with another to build up a composite beam of sufficient intensity), and what kind of light is needed (e.g., color of light)—in essence, evaluating existing lighting conditions and comparing to desired lighting conditions to identify deficiencies in the lighting design or factors that may put demands on the retrofit luminaire design. This is, of course, in addition to traditional lighting design evaluation such as, e.g., determining which objects (e.g., trees, spectator seating, overhead scoreboards) have been installed since the original lighting design and which now obstruct the target area or adversely impact lighting conditions.

A second step 4002 comprises evaluating requirements for the retrofit light source; namely, evaluating any potential physical or photometric interference of the proposed retrofit fixtures given the input from step 4001. As previously stated, there are times when the retrofit fixture simply cannot use the existing crossarm footprint (e.g., crossarms are warped, desired light levels cannot be reached at a one-for-one replacement level) and so a completely new fitter is needed—a solution for such a situation is discussed in a subsequent embodiment. The present embodiment assumes the existing crossarm footprint is adequate for a one-for-one replacement using the wattages and LED count already described above for step 6002b of method 6000. Furthermore, the present embodiment assumes the existing lighting system pole cannot withstand the EPA, weight, or both of a traditional LED luminaire. It is well known that LEDs require substantial heat sinks to cool the LEDs such that they achieve the long life purported as one of their benefits, and it is well known that LED luminaires designed with substantial heat sinks are heavy. When taking into account that often at least two traditional LED luminaires are needed to reach the light levels of an older HID luminaire (e.g., due to the glare control measures taken in the current state of the art, as already discussed), it has been found that many poles simply cannot function safely using traditional LED luminaires as a retrofit solution. As such, step 4002 also includes consideration of how hard LEDs must be driven to achieve desired light levels, and how robust the corresponding heat sink (or other active or passive cooling means) must be to maintain LED life—and how that impacts retrofit fixture weight and EPA.

Step 4003 comprises determining desired beam cutoff; this harkens back to the idea of increasing useful light. As previously stated, specialized lighting system retrofits vary widely in terms of lighting requirements, and some situations require extreme cutoff to avoid onsite glare (e.g., glare from a catcher directly viewing a light source when glancing toward first or third bases); other situations have such antiquated lighting technology that users have grown accustomed to a high level of spill light and glare and would actually protest if too much cutoff was provided (e.g., because parking lots would no longer benefit from extra light, because spectator seating is no longer illuminated thereby eliminating advertising or entertainment value). Consideration of all of the above is necessary according to step 4003, and will likely vary from site to site. The present embodiment assumes moderate glare control in the existing lighting system, though subsequent embodiments address situations when less or more glare control, including in situ (i.e., field) adjustability of glare control, is needed.

Step 4004 is closely related to step 4003 and previous steps as the shape of the beam needed, the intensity at the target area, and the desired cutoff will all inform which types of light directing and light redirecting devices are needed for the application; here, light directing devices are understood to comprise devices which direct light and generally include lenses (primary and secondary), filters, and structural elements (e.g., adjustable armatures), whereas light redirecting devices are understood to comprise devices which redirect or block light and generally include reflectors, light blocks, prisms, louvers, and visors. For example, a lighting designer may determine total optical efficiency is improved by using reflectors instead of secondary lenses (e.g., by avoiding Fresnel losses), but that the lack of beam control using reflectors prohibits such an approach—and so light redirecting devices external to the fixture housing (e.g., at the visor) might be included to tighten up beam control, but this may required the designer to consider specularity of said external light redirecting devices to ensure beam overlapping is smooth and there are no striations. All of this is contemplated according to step 4004.

In practice, the lighting system of FIGS. 1-4 operating with the power regulating and connection means of FIGS. 8-10 might be retrofitted to include LED retrofit luminaires such as are illustrated in FIGS. 12-20. LED retrofit fixture 600A generally comprises a thermally conductive housing 602 including a plurality of heat fins 601 to dissipate heat from the aforementioned 224 XM-L LEDs which are mounted directly to housing 602 at an internal surface in an internal space of housing 602. A light transmissive lens 603 is sealed against the opening into the internal space of housing 602 at housing cap 604 such that light emitted from LEDs 2001 and associated light directing devices 2002, light redirecting devices 2004, and optics holders or fastening devices 2003 (collectively internal devices 2000A) is transmitted through lens 603 and generally towards target area 100 via aiming of adjustable armature 120; adjustable armature 120 may be of a design such as that described in U.S. patent application Ser. No. 12/910,443 hereby incorporated by reference in its entirety, or otherwise.

LED retrofit fixture 600A weighs approximately 20% less than conventional LED luminaires producing comparable light levels at the same approximate fixture size (here, approximately 26" wide and ~16" long)—and retrofit fixture 600A demonstrates far greater glare control than conventional LED luminaires used in retrofits. This is primarily due to the construction of external visor 605 which is affixed to housing 602 (or is otherwise generally proximate thereto) and which generally includes a rigid or semi-rigid lightweight skin 606 (e.g., 0.04" thick aluminum) formed around a lightweight polystyrene foam insert 610 (e.g., to provide extra rigidity when installing fixtures); skin 606 is typically blackened or otherwise coated to reduce reflections from fixtures higher in the array (i.e., photometric interference), said coating also aiding in corrosion protection. Affixed to the underside of foam insert 610 by riveting, gluing, or other means is a lightweight reflective portion 608 (e.g., 0.02" thick aluminum) which has been peened to produce diffuse reflection in accordance with step 4004 of method 4000. Side reflective portions 609 (e.g., 0.02" thick aluminum)— which may be likewise affixed to foam insert 610 or affixed directly to skin 606—produces specular reflection to aid in horizontal beam control. In terms of glare control and uplight, LED retrofit fixture 600A includes means for onsite glare control; namely, the aforementioned coating of skin 606 as well as ribbing on a portion of housing cap 604 (e.g., to trap light which might otherwise strike the front of the luminaire as light is transmitted through lens 603). Visor 605 produces a 12 degree cutoff—cutoff being measured from the bottommost point of the bottommost LED in LED array 2001 to the distalmost tip of visor 605 (as is well known in the art)—which produces a moderate beam cutoff and some relatively uncontrolled light upwardly. Again, the amount of uplight needed is dependent upon what a user considers to be useful for the application; other cutoffs are discussed in subsequent embodiments.

Of course, there is a compromise to be made in LED retrofit luminaire 600A; as can be seen from the figures, functionality to provide pivoting of the visor separate from the housing (such as is discussed in U.S. Pat. No. 9,631,795 hereby incorporated by reference in its entirety) is absent. However, onsite (i.e., in situ) adjustment of cutoff—without significantly affecting EPA or weight—is provided for, and is discussed in a subsequent embodiment.

D. Exemplary Method and Apparatus Embodiment 2

As previously discussed, at times an existing crossarm cannot be used. In such instances there is an opportunity to still provide a cost-effective LED retrofit solution, and one that can add the benefit of being pre-aimed at the factory to ease onsite installation; this is discussed in U.S. Pat. No. 8,717,552 hereby incorporated by reference in its entirety.

In such a situation method 6000 proceeds as was described for Embodiment 1; this is likewise true for method 5000 (with respect to reconciling disparate power requirements) and method 4000 (with respect to designing the retrofit luminaire), with a few possible differences which are presently discussed.

Power Regulating Means and Wiring

In the event that an entire array of LED retrofit luminaires are provided on a new fitter (which generally includes new adjustable armatures, crossarms, bracketry, top pole section, etc.) it makes sense to also provide a new wire harness for said luminaires (see FIGS. 2B and C). As such, it may be preferable to mount the board to its own enclosure 130 which is further affixed to existing cabinet 50; see FIG. 21. The benefit of this approach is that solid state devices of circuit 1000 are isolated from temperature and vibrations from the ballasts of cabinet 50. Thus, when completing installation (step 6003, FIG. 6) instead of connecting each luminaire to existing wiring at the top of a pole, an entire array of LED retrofit luminaires 3000 can be slip-fit onto the existing pole (FIG. 22), new wiring dropped down the internal space of the pole, a small enclosure 130 stacked on enclosure 50, and quick connections made to complete the circuit; of course, the new pole section of the new fitter could be bolted or otherwise mated to the existing pole section (rather than be slip fit).

LED Retrofit Luminaire

LED retrofit luminaire 600A could certainly be used in the above situation, but the present embodiment assumes sharper cutoff is needed for additional glare control (e.g., a residence is immediately past the outfield of target area 100) or for playability (e.g., at pole locations in the line-of-sight of a baseball outfielder)—as determined by step 4003 of method 4000. As such, LED retrofit luminaire 600B can be produced by simply hooking a visor 615 onto the distalmost part of visor 605 via hooks inserted into slots 607 in visor 605 (see FIG. 31). Internal devices 2000 are not modified from Embodiment 1 (i.e., are of the configuration illustrated for 2000A), and as can be seen from FIGS. 23-30, visor 615 is constructed in the same manner as visor 600. The difference is in beam cutoff and footprint; whereas Embodiment 1 provided a 12 degree cutoff at ~26" wide and ~16" long, the present embodiment provides an 8 degree cutoff at ~26" wide and ~24" long. A smaller degree cutoff corresponds to a sharper transition (i.e., a smaller distance) from the geometric center (i.e., the center optic axis—which is generally perpendicular to the die of the LED (unless the optic face is tilted) and extends outwardly from the emitting face of the optic) of a beam to the edge of the beam (i.e., to a point of no measurable and/or perceivable light); the compromise here being potentially increased EPA. However, it can be appreciated that LED retrofit fixture 600B is highly customizable—visor 615 can be short, long, angled, of a different shape than visor 605, etc.—and so could potentially be designed to suit a wide range of desired EPA or to withstand wind at a variety of sites.

E. Exemplary Method and Apparatus Embodiment 3

As previously discussed, at times the existing lighting system has such poor light control that a user has become accustomed to spill light and glare—so much so that a user relies on it as useful for such things as lighting adjacent spaces (e.g., parking lots, pathways, etc.). If desired, some degree of spill outward or upward from the target area can be provided while still providing a cost-effective LED retrofit solution according to aspects of the present invention. In such a situation method 6000 proceeds as was described for Embodiments 1 or 2; this is likewise true for method 5000 (with respect to reconciling disparate power requirements) and method 4000 (with respect to designing the retrofit luminaire). Ultimately, the direction taken according to the present embodiment will depend on the integrity of the other portions of the existing lighting system—which is evaluated according to step 6001 of method 6000. The general goal, as previously stated, is to preserve as much of the existing lighting system as is possible (if wise to do so).

Power Regulating Means and Wiring

Depending on the condition of enclosures and wiring, as well as available spacing in existing enclosures (since older generation lighting systems may have some enclosures up at the top of the pole and some enclosures at the bottom of the pole, none of which have space for board 1000), the approach taken in either Embodiment 1 or 2 may be used to reconcile disparate power requirements according to method 5000.

LED Retrofit Luminaire

FIGS. 32-39 illustrate a third embodiment of LED retrofit luminaire which will likely only be used in situations where some degree of spill upward or outward is desirable. As can be seen from the figures, LED retrofit luminaire 600C includes all the same primary components of Embodiments 1 and 2; namely, visor 605, adjustable armature 120, housing 602 with heat sink 601, lens 603, and internal devices 2000.

Internal devices 2000 may be of the configuration discussed for Embodiments 1 and 2 (i.e., reference no. 2000A), or otherwise. At least one other configuration of internal devices is discussed below, though it is not anticipated that configuration would be used with this embodiment, though such is not precluded. In the present embodiment visor 605 (which is affixed to or otherwise proximate housing 602) is significantly shortened—~12" long as opposed to ~16" long in Embodiment 1 and ~24" long in Embodiment 2—which produces a cutoff of 17 degrees. The larger degree cutoff corresponds to a more gradual transition (i.e., a larger distance) from the geometric center (as previously described) of a beam to the edge of the beam (as previously described)—which allows for an onsite glow or higher perceived ambient light that might be well suited to illuminating spaces adjacent to the target area.

F. Options and Alternatives

The invention may take many forms and embodiments. The foregoing examples are but a few of those. To give some sense of some options and alternatives, a few examples are given below.

While aspects of the invention have been directed towards lighting system retrofits, and more specifically, specialized lighting systems retrofits, it is important to note the invention is not limited to such. For example, the existing lighting technology may not be HID; for example, it could be fluorescent. As another example, the newer lighting technology may not be LED; for example, it could be OLEDS or laser diodes. As another example, the lighting application may not relate to sports. As another example, the new technology may not even be a lighting technology—an existing lighting system might be retrofitted to include sensors or other devices (e.g., power supplies, communication equipment, surveillance equipment) that may or may not include a lighting component. As another example, the LED retrofit fixtures discussed herein may be used in new installations rather than in retrofit situations. Various permutations of concepts discussed herein might be appropriate; for example, a retrofit situation might require an enclosure 130 of Embodiment 2 but paired with LED retrofit fixture 600A of Embodiment 1. As yet another example, the exact size, shape, number, and other characteristics of internal devices 2000 may differ, or be tailored to work with external visors 605/615 so to address a particular retrofit need. For example, the curvature of reflective portion 608 or angling of side reflective portions 609 may differ from what is illustrated depending on the cutoff of visor 605 or beam spread of the light emitted from internal devices 2000 (see additional discussion in U.S. Provisional Patent Application Ser. No. 62/457,641 to which the instant application claims priority). Likewise, values and configuration of components in capacitor bank 500 and circuit 1000 might differ (see additional discussion in U.S. Provisional Patent Application Ser. No. 62/522,345 to which the instant application claims priority). As another example, portions of circuit 1000 might be omitted or exist elsewhere in the system; for example, sub-circuit 1002 might be omitted if there is not a history of nuisance tripping, or might be included upstream of the rest of board 1000 (e.g., before ballast 400) if evaluation of the existing lighting system according to step 6001 of method 6000 reveals breakers need to be replaced (limiting inrush to the ballast and capacitors could permit a smaller size of breaker—another cost benefit). Also, additional features are possible. For example, circuit 1000 might also including a clamping circuit—which is a well known circuit design in the state of the art that essentially grounds a circuit and sacrifices a fuse when voltage increased to some defined threshold—so to protect portions of the retrofit system in the event the load is accidentally removed from the circuit (as ever increasing voltage absent a load can occur in ballasted circuits); this could be included as part of step 5005 of method 5000.

All of the above options and alternatives are possible, and envisioned. Some further, more specific, options and alternatives are presently discussed.

LED Retrofit Luminaire for Uplight

As may be appreciated, it has been found that a lack of glare control in older lighting technology was actually beneficial for specific situations. Spill light from older HID luminaires spilled in all directions (including upward), and so provided necessary uplight to track a ball's flight. With the advent of LED lighting, lighting systems have become somewhat "over-designed" insomuch that in the endeavor to make light more useful, necessary uplight has all but been eliminated. While this is not an issue for some lighting applications, it is certainly an issue for aerial sports that require it for playability and player safety. As such, one possible option and alternative includes provisions for specific, controlled uplight. FIGS. 40 and 41 illustrate an LED retrofit luminaire 600D which is generally of the construction of that of Embodiment 1, but includes a distalmost uplight visor 625 having top and bottom reflective portions (626 and 627, respectively) and generally affixed to visor 605. Uplight visor 625 may include pivoting functionality 628 such as that described in aforementioned U.S. Pat. No. 9,631,795 so to provide customized levels of uplight. For example, a typical baseball lighting application in which LED retrofit luminaire 600D is aimed 25 degrees down from horizontal may utilize an uplight visor 625 pivoted 12 degrees up from horizontal so to redirect approximately 9% of total light emitted upward; for a typical football lighting application, that same fixture 600D might—instead pivot visor 625 8 degrees up from horizontal so to redirect approximately 6.5% of total light emitted upward (as football typically requires less intense uplight). In practice, LED retrofit luminaire 600D would likely only be used in situations where low-mounted uplights (such as is illustrated in FIG. 8A of aforementioned U.S. Pat. No. 9,631,795) were precluded due to site restrictions or existing pole loading, though this could differ—as could the degree to which visor 625 may be pivoted (currently on the order of 5 to 15 degrees), and as could the finish or processing of top and bottom reflective portions 626/627 (currently producing diffuse or semi-specular reflection).

LED Retrofit Luminaire for Increased Lumen Density, Horizontal Control, and/or More Useful Light As previously discussed, there are times that an existing lighting system is so antiquated that even if light levels are restored to their original level by a retrofit system, the retrofit lighting system will still be out of code or compliance. For example, a sports field might have an older HID lighting system but since the time of installation the field has been expanded or now includes a higher level of play (e.g., going from recreational baseball to semi-professional baseball). Light levels for various sports is highly regulated, and so a one-for-one retrofit—even if the luminaire is well designed and produces comparable light as the existing system at its prime—may not be good enough. There is still an opportunity to provide a cost-effective LED retrofit solution according to aspects of the present invention; this is illustrated in FIGS. 42-45.

FIG. 42 illustrates a method for increasing LED count while restricting horizontal beam spread so to produce more useful and lumen-dense lighting, and may generally be included in steps 4001 and 4002 of method 4000. By way of example and not by way of limitation, consider method 7000 applied to retrofit fixture 600A of Embodiment 1. A first step 7001 comprises improving a critical angle, if possible; this could be the angle previously mentioned when determining cutoff, or a critical angle as is discussed in aforementioned U.S. Provisional Patent Application Ser. No. 62/457,641, or otherwise. Next, according to step 7002 some portion of internal devices 2000 are removed so to increase available space for additional LEDs. Finally, beam control which was lost by removing at least some internal devices 2000 is restored by adding external devices to visor 605.

As can be seen from FIGS. 43-45 LED retrofit fixture 600A is modified to produce LED retrofit luminaire 600E in the following ways.

internal optic holders 2003 have been removed to increase available space
  secondary lenses 2002 are now formed from a single silicone molded optic array which can be heat staked to a thin substrate (not illustrated) or pinned into position by the silicone itself (see aforementioned U.S. Provisional Patent Application Ser. No. 62/457,641 for a number of possible apparatus and methods)
  internal reflective side visors 2004 have been removed
  LED count has been increased from 224 XM-L LEDs to 348 XM-L LEDs and arranged so to produce a desired critical angle
  one or more external reflective v-shaped visors 630 are added to visor 605

As can be appreciated, by removing internal reflective side visors 2004 not only can LED count be increased, but the depth of the internal space of housing 602 is reduced (i.e., since the needed distance from LEDs 2001 to lens 603 is reduced). Thus, for a given luminaire size more material is available for thermal transfer, which translates to a more robust heat sink, which helps to ensure lower temperatures. But perhaps more importantly, additional space for additional LEDs means that for a given application, LEDs can be run at a lower current—which ensures a higher efficacy (and therefore makes the overall solution more cost effective).

LED Retrofit Luminaire for Extreme Cutoff and Glare Control, and Field Adjustment Finally, to provide a truly customizable LED retrofit solution, onsite adjustability of cutoff is desirable. As previously stated, sites vary, lighting applications vary, and the art and science of retrofitting specialized lighting systems is such that sometimes a design looks good on paper but something is slightly off during installation. As such, it is possible that any of the LED retrofit fixtures discussed herein could be added to by including a sliding light block 650 which could be selectively inserted into and out of the composite beam projected from LEDs and transmitted out lens 603; this is illustrated in FIGS. 46 and 47. This small device (e.g., on the order of 0.93" in height) is designed to be light absorbing (e.g., via blackening), and can be raised or lowered (e.g., by loosening and then tightening bolts or other connection means) so to affect beam cutoff to a small degree—without impacting EPA (note raised feature 651) and without redirecting light back towards the fixture thereby causing onsite glare or other adverse lighting effects. Though FIGS. 46 and 47 illustrate modification of LED retrofit fixture 600B of Embodiment 2 so to produce LED retrofit fixture 600F, any embodiment or permutation thereof could be likewise modified; for example, inclusion in LED retrofit fixture 600A provides a variable cutoff of 9 to 12 degrees, inclusion in LED retrofit fixture 600B provides a variable cutoff of 6 to 8 degrees, and inclusion in LED retrofit fixture 600C provides a variable cutoff of 13 to 17 degrees.

What is claimed is:

1. A method of retrofitting an existing lighting system comprising non-lighting technology and lighting technology portions with a retrofit lighting system comprising non-lighting technology and lighting technology portions, the non-lighting technology portion of the retrofit lighting system including one or more retained devices of the non-lighting technology portion of the existing lighting system, further comprising:
 a. evaluating the existing lighting system to determine:
  i. which non-lighting technology portions of the existing lighting system can be retained;
  ii. which portions of light emitted from the existing lighting system are useful and which are not useful;
  iii. which lighting technology and non-lighting technology portions of the existing lighting system contribute to glare; and
  iv. characteristics of power regulating and connection means of the existing lighting system;
 b. designing the lighting technology portion of the retrofit lighting system by:
  i. selecting an operating condition of a retrofit light source so to produce a light level which is comparable to or exceeds a light level of the useful portion of light emitted from the existing lighting system;
  ii. selecting a number and design of both light directing and light redirecting devices so to produce a cutoff and beam design which results in (i) lower glare, (ii) lower or fewer portions of light which are not useful, or both (i) and (ii), as compared to the existing lighting system; and
  iii. installing the retrofit light source, light directing devices, and light redirecting devices in a retrofit luminaire;
 c. designing the non-lighting technology portion of the retrofit lighting system comprising:
  i. determining power requirements of the retrofit luminaire so to produce the light level which is comparable to or exceeds a light level of the useful portion of light emitted from the existing lighting system; and
  ii. modifying the characteristics of power regulating and connection means of the existing lighting system to meet the power requirements of the retrofit luminaire;
 d. and installing the retrofit lighting system in a manner that does not exceed a loading capacity or an allowed EPA for the one or more retained devices of the non-lighting technology portion of the existing lighting system.

2. The method of claim 1 wherein the step of designing the lighting technology portion of the retrofit lighting system further comprises selecting reflective properties and angle of an uplight visor, and wherein the step of installing the retrofit light source, light directing devices, and light redirecting devices in a retrofit luminaire further comprises installing the uplight visor in the retrofit luminaire at the selected angle so to produce a desired amount of uplight.

3. The method of claim 1 wherein the lighting technology portion of the existing lighting system comprises an HID luminaire, and wherein the retrofit luminaire comprises an LED luminaire containing one or more LEDs.

4. The method of claim 3 wherein the one or more retained devices of the non-lighting technology portion of the existing lighting system include at least a portion of one or more poles and at least a portion of the power regulating means.

5. The method of claim 4 wherein the step of modifying the characteristics of the power regulating and connection means of the existing lighting system to meet the power requirements of the retrofit luminaire comprises:
 a. rectifying power downstream of a ballast of the existing lighting system; and
 b. conditioning the rectified power to provide a desired capacitance or current upstream of the LED luminaire.

6. The method of claim 4 wherein the LED luminaire is lightweight and wherein the step of installing the retrofit lighting system in a manner that does not exceed a loading capacity or an allowed EPA for the one or more retained devices of the non-lighting technology portion of the existing lighting system comprises slip-fitting an array of one or more pre-aimed lightweight LED luminaires on the pole.

7. The method of claim 4 wherein the one or more retained devices of the non-lighting technology portion of the existing lighting system further includes at least a portion of the connection means and at least a portion of a crossarm.

8. The method of claim 7 wherein the LED luminaire is lightweight and wherein the step of installing the retrofit lighting system in a manner that does not exceed a loading capacity or an allowed EPA for the one or more retained devices of the non-lighting technology portion of the existing lighting system comprises installing on a one-for-one basis the lightweight LED luminaire for the HID luminaire, the LED luminaire fitting in a same crossarm footprint as the HID luminaire.

9. An LED retrofit lighting system designed to replace an existing lighting system on a one-for-one luminaire basis comprising:
 a. an adjustable armature adapted to permit panning and tilting;
 b. an LED retrofit luminaire comprising:
  i. a housing sized to fit in a footprint of an existing lighting system luminaire when affixed to the adjustable armature;
  ii. one or more LEDs contained in an opening in the housing;
  iii. one or more light directing devices;
  iv. one or more light redirecting devices;
  v. a light transmissive lens sealed against the opening of the housing; and
  vi. a lightweight visor proximate the housing and sized to fit in the footprint of the existing lighting system luminaire when the adjustable armature is panned and tilted; and
 c. a retrofit control circuit comprising:
  i. a capacitor bank; and
  ii. a rectifying sub-circuit.

10. The LED retrofit lighting system of claim 9 wherein the retrofit control circuit is adapted for high power operation.

11. The LED retrofit lighting system of claim 9 wherein a capacitance of the capacitor bank is selected to produce a specified amount of flicker of the one or more LEDs at an operating condition which produces a light level which is comparable to or exceeds a light level of the light emitted from the existing lighting system.

12. The LED retrofit lighting system of claim 9 wherein the lightweight visor comprises a rigid or semi-rigid lightweight skin formed around a lightweight polystyrene foam insert.

13. The LED retrofit lighting system of claim 9 further comprising an uplight visor adapted to direct a portion of light from the one or more LEDs away from a plane and into an aerial space.

14. An LED retrofit lighting system designed to replace an existing lighting system while retaining one or more devices of the existing lighting system comprising:
- a. a fitter comprising:
  - i. a pole section adapted to mate to a retained pole section of the existing lighting system; and
  - ii. one or more crossarms affixed to the pole section of the fitter;
- b. one or more adjustable armatures affixed to the crossarms at one end and adapted to permit panning and tilting;
- c. one or more LED retrofit luminaires each comprising:
  - i. a housing affixed to the adjustable armature;
  - ii. one or more LEDs contained in an opening in the housing;
  - iii. one or more light directing devices;
  - iv. one or more light redirecting devices;
  - v. a light transmissive lens sealed against the opening of the housing; and
  - vi. a lightweight visor proximate the housing; and
- d. a retrofit control circuit comprising:
  - i. a capacitor bank; and
  - ii. a rectifying sub-circuit.

15. The LED retrofit lighting system of claim 14 wherein the one or more retained devices of the existing lighting system further comprises a retained ballast, and wherein the rectifying sub-circuit converts AC power to DC power.

16. The LED retrofit lighting system of claim 15 wherein the retrofit control circuit further comprises an inrush current sub-circuit.

17. The LED retrofit lighting system of claim 16 wherein the inrush current sub-circuit is upstream of the retained ballast.

18. The LED retrofit lighting system of claim 14 wherein a capacitance of the capacitor bank is selected to produce a specified amount of flicker of the one or more LEDs at an operating condition.

19. The LED retrofit lighting system of claim 18 further comprising a second capacitor bank, the capacitance of the second capacitor bank selected to produce one or more of (i) a desired signal smoothness and (ii) a desired operating current for the one or more LEDs.

20. The LED retrofit lighting system of claim 14 wherein the lightweight visor comprises a rigid or semi-rigid lightweight skin formed around a lightweight polystyrene foam insert.

* * * * *